United States Patent
Ho

(10) Patent No.: US 9,425,669 B2
(45) Date of Patent: Aug. 23, 2016

(54) BALL JOINT UNIVERSAL ROTARY MOTOR, A MANUFACTURING METHOD AND A WORKING MECHANISM THEREOF

(71) Applicant: Kuokwa Ho, Macau (CN)

(72) Inventor: Kuokwa Ho, Macau (CN)

( * ) Notice: Subject to any disclaimer, the term of this patent is extended or adjusted under 35 U.S.C. 154(b) by 15 days.

(21) Appl. No.: 14/630,685

(22) Filed: Feb. 25, 2015

(65) Prior Publication Data
US 2015/0171700 A1 Jun. 18, 2015

Related U.S. Application Data

(62) Division of application No. 14/288,504, filed on May 28, 2014, now Pat. No. 9,000,628, which is a division of application No. 14/088,056, filed on Nov. 22, 2013, now Pat. No. 8,786,145.

(51) Int. Cl.

| | |
|---|---|
| *H02K 33/00* | (2006.01) |
| *H02K 7/00* | (2006.01) |
| *H02K 3/12* | (2006.01) |
| *H02K 3/28* | (2006.01) |
| *H02K 15/04* | (2006.01) |
| *H02K 99/00* | (2014.01) |
| *H02K 41/03* | (2006.01) |
| *H02K 1/17* | (2006.01) |
| *H02K 1/28* | (2006.01) |
| *H02K 7/08* | (2006.01) |

(52) U.S. Cl.
CPC .. *H02K 7/00* (2013.01); *H02K 1/17* (2013.01); *H02K 3/12* (2013.01); *H02K 3/28* (2013.01); *H02K 15/0435* (2013.01); *H02K 41/031* (2013.01); *H02K 57/006* (2013.01); *H02K 1/28* (2013.01); *H02K 7/088* (2013.01); *H02K 2201/18* (2013.01); *Y10T 29/49009* (2015.01); *Y10T 29/49012* (2015.01)

(58) Field of Classification Search
CPC .......... H02K 1/17; H02K 3/28; H02K 21/26; H02K 21/12; H02K 2201/18
USPC ............ 310/36, 179–181, 198, 199, 264, 310
See application file for complete search history.

(56) References Cited

U.S. PATENT DOCUMENTS

| 4,719,381 A * | 1/1988 | Miles ...................... H02K 41/02 310/166 |
| 2012/0133234 A1* | 5/2012 | Da Costa Balas Ferreira ............... H02K 7/1853 310/179 |

* cited by examiner

*Primary Examiner* — Thanh Lam
(74) *Attorney, Agent, or Firm* — IPro, PLLC; Na Xu

(57) ABSTRACT

Described herein is a ball joints universal rotary motor, a manufacturing method and a working mechanism thereof. The ball joints universal rotary motor comprises a housing, a spherical-cap shaped stator body, and a rotor body configured to be secured within the stator body. The stator body is made from a permanent magnet. The rotor body comprises multiple layers of armatures and multiple spacer layers. The multiple layers of armatures are symmetrically distributed along the axis of the rotor body. A spacer layer is provided between two adjacent layers of armatures. The multiple layers of armatures and multiple spacer layers are securely connected by a bolt. The bolt and the rotor body are axially connected. The rotor body is of a spherical shape. Each layer of the armatures is wound with two layers of coils: a first layer and a second layer. The motor as provided is configured to realize movement in multiple directions. The present disclosure provides an embodiment of a motor with a pump assembly, and another embodiment of a motor without a pump assembly. Examples of applications of the present disclosure include joints and areas of an intelligent bionic robot, various industrial devices, and household appliances.

6 Claims, 26 Drawing Sheets

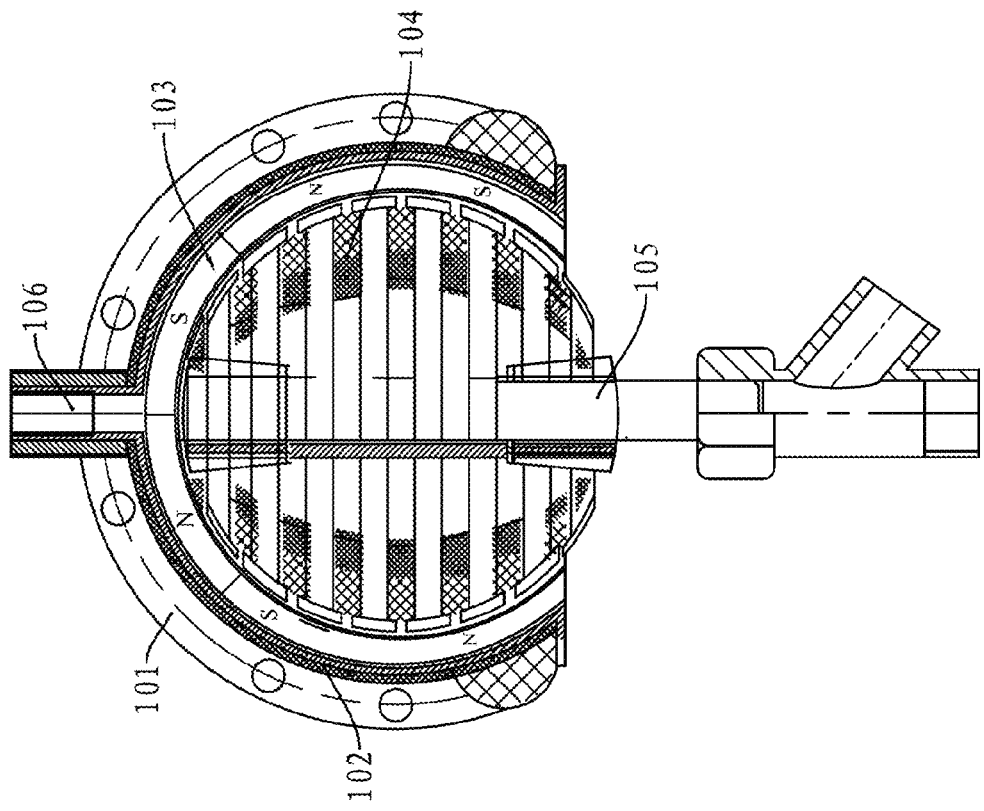
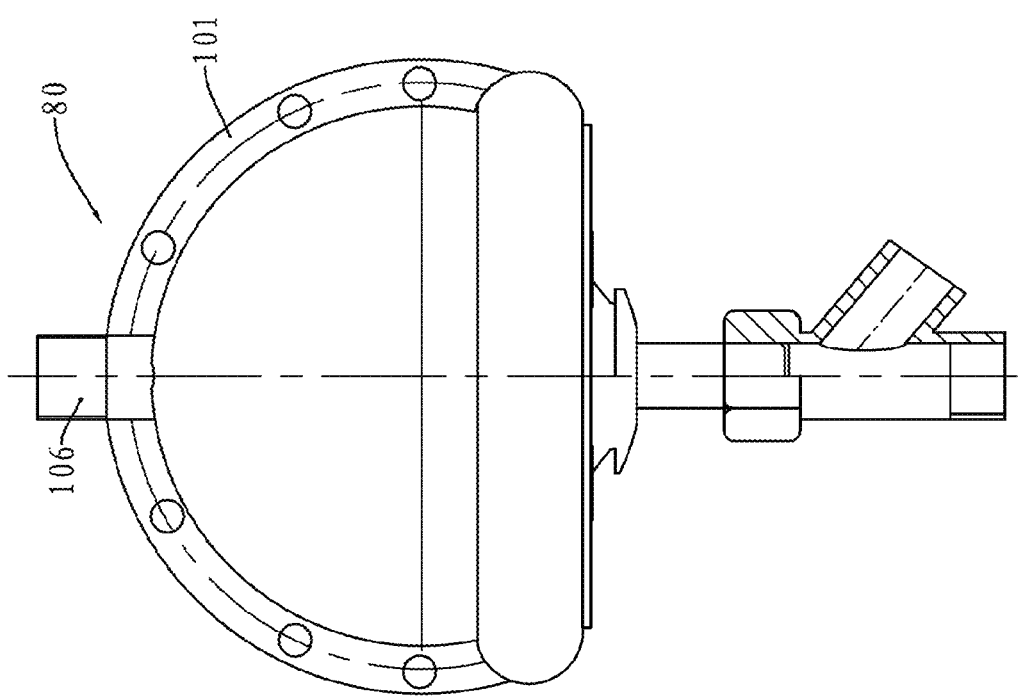
Fig. 20
Fig. 19

BALL JOINT UNIVERSAL ROTARY MOTOR, A MANUFACTURING METHOD AND A WORKING MECHANISM THEREOF

RELATED APPLICATION

This application is a divisional application of U.S. patent application Ser. No. 14/288,504, filed on May 28, 2014, which is a divisional application of U.S. patent application Ser. No. 14/088,056, filed on Nov. 22, 2013, both of which are hereby incorporated by reference in its entirety.

TECHNICAL FIELD

The disclosure herein relates to electrical fields, in particular to a three-dimensional ball joint universal rotary motor and a manufacturing method and a working mechanism thereof.

BACKGROUND

Electrical motors are widely used in the electrical appliances of people's life, and in manufacturing and production and various military equipment. An existing motor has a stator and a rotor, with a rotor shaft installed within the rotor and rotates with the rotor; as such, the motors output power. Because a rotor shaft of the an existing motor can only rotate with respect to the axis of the motor, the motor is called a planar motor for the reason that the movement of the rotor shaft has only one degree of freedom.

As shown in a prior art in FIG. 1, an existing motor may comprise a housing 10, and two end caps 11 and 12 at two ends of the housing 10. The housing 10 and the end caps 11 and 12 form a chamber. A stator 15 and a rotor 18 are provided in the chamber. The stator 15 comprises a stator core 16, and coils 17 wound on the stator core 16. The rotor 18 is provided within the stator 15, and may rotate with respect to the stator 15. A rotor shaft 19 is installed within the rotor 18, and through the interference fit with the rotor 18, the rotor shaft 19 is driven by the rotor 18 to rotate to output power.

A stator core 16 is generally formed by stacking multiple pieces of stator laminations of similar shapes. As shown in FIG. 2, a stator lamination 20 is formed by stamping a silicon steel plate material. The stator lamination is of an annular shape, and comprises a magnet yoke portion 21 at its outer periphery section. The magnet yoke portion 21 is of an annular shape. The stator lamination 20 also comprises multiple teeth 22 which project from the magnet yoke portion 21 outwardly from the center of the stator sheet along its radial direction. A winding slot forms between two adjacent teeth. A coil may be wound on a tooth 22.

As each stator lamination 20 is provided with a hollow center hole 24, the center holes 24 of the stator core 61 of the multiple stacked stator laminations form a rotor hole, to accommodate the rotor within.

The rotor core is formed by stacking multiple pieces of rotor laminations. A rotor core may be wound with coils of the rotor, or with aluminum molding. When a coil of the stator is energized, the AC current generates an alternating magnetic field in the coil 17 of the stator; the rotor 18 is driven by the magnetic field to rotate, which drives the rotor shaft 19 to rotate as well. Therefore, the stator 15 works as armature of the motor to receive electrical energy and to generate an alternating magnetic field.

However, many electrical appliances and industrial devices require components that may perform movement with multiple degrees of freedom. As an existing motor may move in only one degree of freedom, it cannot satisfy the application needs of the current electrical devices. Presently, multiple motors are used to perform movement with multiple degrees of freedom, which results in larger number of motors and a bigger volume in a device, and higher production cost.

Additionally, when one of the multiple motors breaks down, the whole device runs into a problem. Therefore such a device has poor stability. Furthermore, multiple motors require more precise control of the motors when working together, and place a very high requirement on the control of the equipment.

SUMMARY

The present disclosure provides a ball joints universal rotary motor that realizes movements in multiple degrees of freedom.

The present disclosure also provides a manufacturing method of said ball joints universal rotary motor.

The present disclosure also provides a working mechanism of said ball joints universal rotary motor.

The ball joints universal rotary motor comprises a spherical-cap shaped housing, a spherical-cap shaped stator body, and a rotor body configured to be secured within the stator body. The stator body is made from a permanent magnet, and is magnetized to form a plurality of magnetic poles. The rotor body comprises multiple layers of armatures and multiple spacer layers. Each layer of the armatures comprises a rotor core formed from stacked multiple layers of silicon steel laminations. The multiple layers of armatures are symmetrically distributed with respect to an axis of the rotor body. A spacer layer is provided between two adjacent rotor cores. The multiple layers of armatures and multiple spacer layers are securely connected by a bolt to form the rotor body. The rotor body is of a spherical shape. Each layer of the armatures is wound with two layers of coils: a first layer and a second layer. The first layer of coils is configured to be wound on the rotor core of the same armature. The second layer of coils on a layer of armature is electrically connected with another second layer of coils on another layer of armature that is symmetrically distributed in equal distance from a center of the rotor body with respect to the layer of armature.

When the first layer of coils in a layer of armature is energized, an alternating magnetic field forms which drives the rotor body to rotate with respect to the bolt. When the second layer of coils in a layer of armature is energized, the rotor body tilts with respect to an axis of the stator body, to realize a movement in a second degree of freedom. An angle of tilting of the rotor body is adjustable by changing the magnitude or the length of time of the electricity in the second layer of coils, to realize a movement in multiple degrees of freedom.

Preferably, each of the two ends of the bolt is respectively provided with a nut, with each nut in a frustum shape. A cross-sectional area of an end of a nut closer to a center of the rotor body is smaller than a cross-sectional area of another end of the nut further away from the center of the rotor body. Therefore, the rotor cores of the multiple layers of armatures and the multiple spacer layers are configured to be securely connected by the bolt and the nuts. The nuts are configured to ensure the secure connection of two outmost layers of armatures to the multiple layers of armatures of the rotor body.

Preferably, the ball joints universal rotary motor further comprises a housing provided outside the stator body. The housing comprises a magnet yoke and a shielding layer outside the magnet yoke.

The stator body realizes transduction of a magnetic field through the magnet yoke; and the shielding layer shields an external interference signal to avoid any impact of an external magnetic field on the ball joints universal rotary motor.

Preferably, the ball joints universal rotary motor further comprises an air inlet that is provided on the housing, and a pump assembly outside the air inlet. The pump assembly pumps high pressure air in between the stator body and the rotor body, to form a magnetic gap between the stator body and the rotor body, so that the rotor body is configured to rotate with respect to the stator body.

Preferably, the ball joints universal rotary motor further comprises an annular projection that is provided on the housing at a notch that is close to the stator body. The annular projection extends in a circumferential direction along the stator body on an outer wall of the housing. The annular projection increases the strength of the housing around the notch that is close to the stator body, which protects the housing from damages.

To realize another goal of the present disclosure, the manufacturing of the ball joints universal rotary motor as provided comprises the following steps. First, magnetizing a permanent magnet into a plurality of magnetic poles, to form a stator body; next, manufacturing a rotor body by cutting silicon steel plate material into multiple silicon steel laminations with varying diameters; next, stacking the multiple silicon steel laminations to form rotor cores of multiple layers of armatures, with a spacer layer in between two adjacent rotor cores; next, securing the multiple layers of armatures by a bolt; next, winding a first layer of coils on a layer of armature; next, winding a second layer of coils on a layer of armature, with the second layer of coils being electrically connected with another second layer of coils on a symmetrically distributed armature that is in equal distance from a center of the rotor body. Next, finishing a spherical shaped rotor body and securely installing the rotor body in the stator body.

As the above scheme shows, after forming a spherical-cap shaped stator body and a spherical shaped rotor body, the alternating magnetic field generated by the first layer of coils on a layer of armature may drive the rotor body to rotate with respect of an axis of the bolt; the rotor body also tilt with respect to the axis of the stator body after current enters a second layer of coils on a layer of armature, to realize the movement of the motor in multiple degrees of freedom.

Preferably, finishing treating an outer surface of the rotor core after the connecting of the armatures by the bolt, so that the overall outer surface of the rotor core substantially approaches a spherical surface.

As such, when the overall outer surface of the rotor core substantially approaches a spherical surface, the rotor body rotates better and more smoothly in the stator body.

The present disclosure provides a working mechanism of said ball joints universal rotary motor, which comprises energizing a first layer of coils of the motor to drive the rotor body to rotate with respect to an axis of the bolt of said rotor body, and energizing a second layer of coils of the motor to allow the tilting of the rotor body with respect to an axis of a stator body, to realize the movement of the motor in a multiple degrees of freedom.

BRIEF DESCRIPTION OF FIGURES

FIG. 19 is a structural view of the second embodiments of the ball joints universal rotary motor without a pump assembly.

FIG. 20 is a cross-sectional view of the second embodiments of the ball joints universal rotary motor without a pump assembly.

The embodiments of the present disclosure are further illustrated below in view of the accompanying drawings.

DETAILED DESCRIPTION

The present disclosure provides a ball joints universal rotary motor. In one embodiment, the ball joints universal rotary motor comprises a pump assembly. In another embodiment, the ball joints universal rotary motor does not comprise a pump assembly. Both embodiments are illustrated in view of the accompanying drawings.

The first embodiment is as below.

Figure 1:
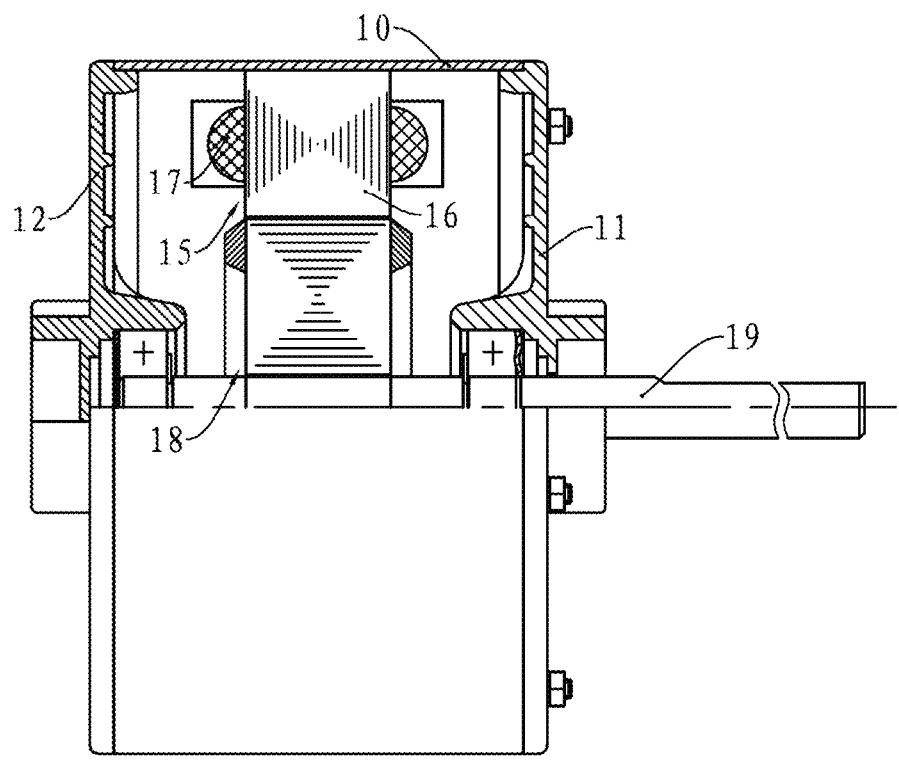
FIG. 1 is a cross-sectional diagram of an existing motor in a prior art.
Figure 2:
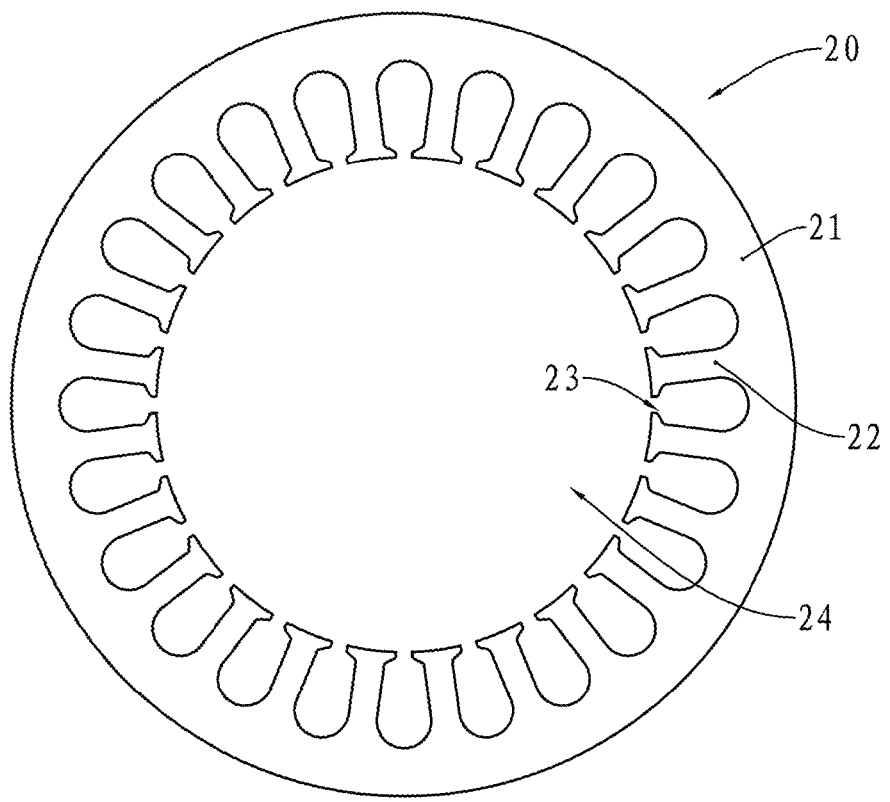
FIG. 2 is a schematic view of a structure of a stator lamination of the motor in FIG. 1.
Figure 3:
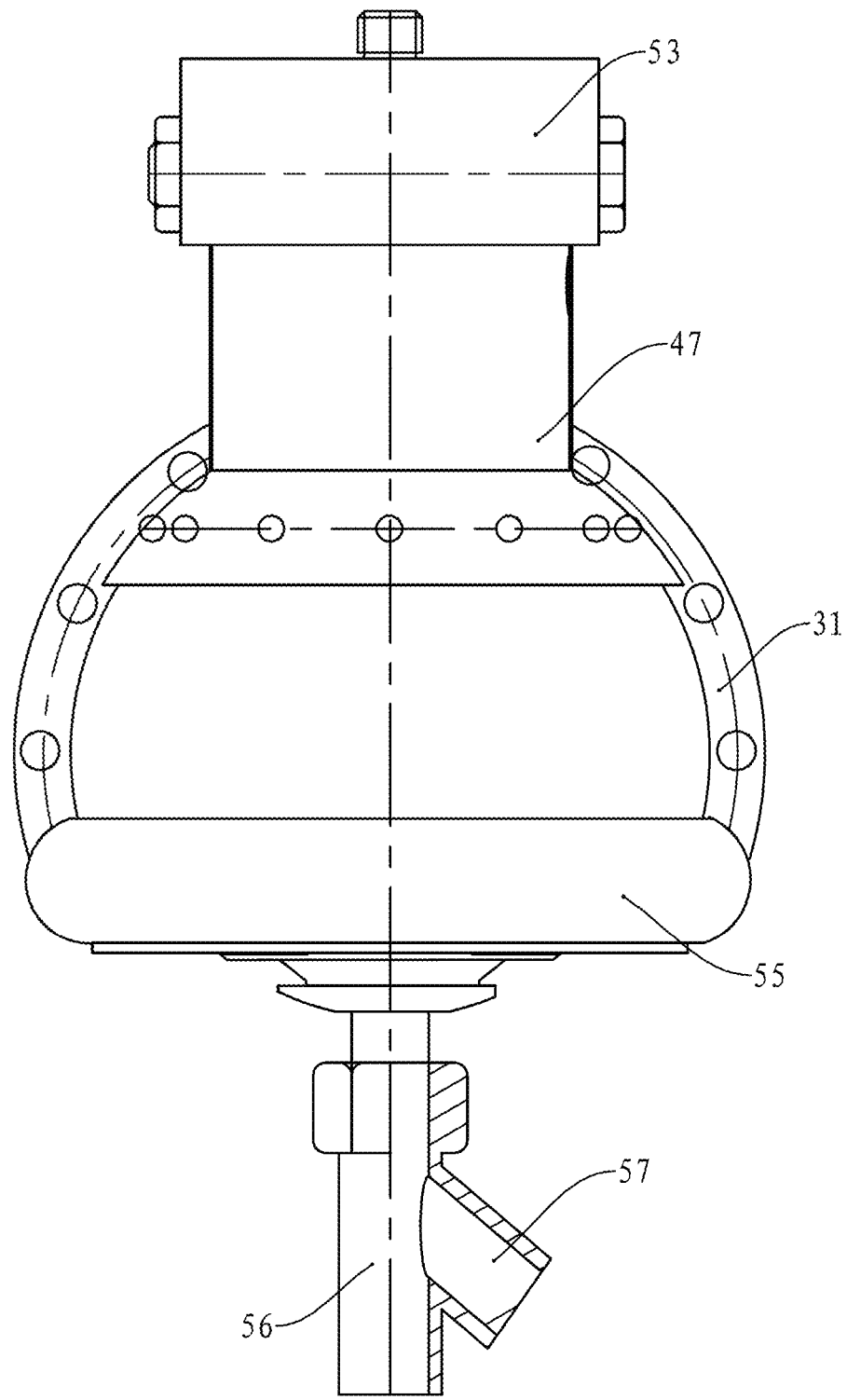
FIG. 3 is a structural view of a first embodiment of the ball joints universal rotary motor with a pump assembly.

As shown in FIG. 3, according to the first embodiment, a ball joints universal rotary motor comprises a spherical-cap shaped housing 31 and a rotor body mounted in the housing 31. The rotor body is spherical in shape. The rotor body is conFig.d to rotate with respect to the housing 31 in a plurality of directions. As such, the motor as provided is different from a drive planar motor. The motor of the present disclosure is conFig.d to realize a plurality of degrees of freedom of movement, and the motor can be called a three-dimensional motor.

Figure 4:
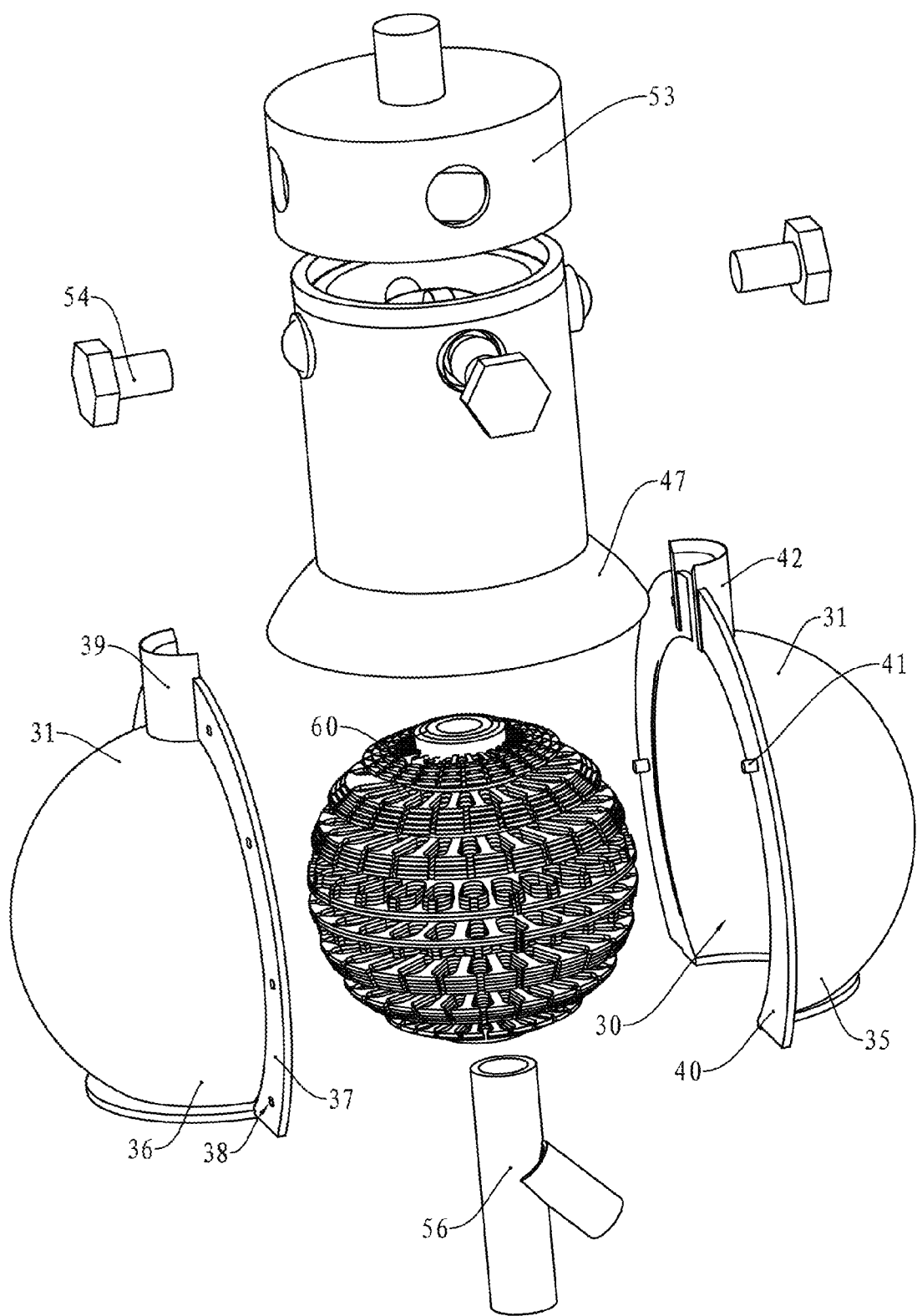
FIG. 4 is a structural explosion view of the first embodiment of the ball joints universal rotary motor with a pump assembly.
Figure 5:
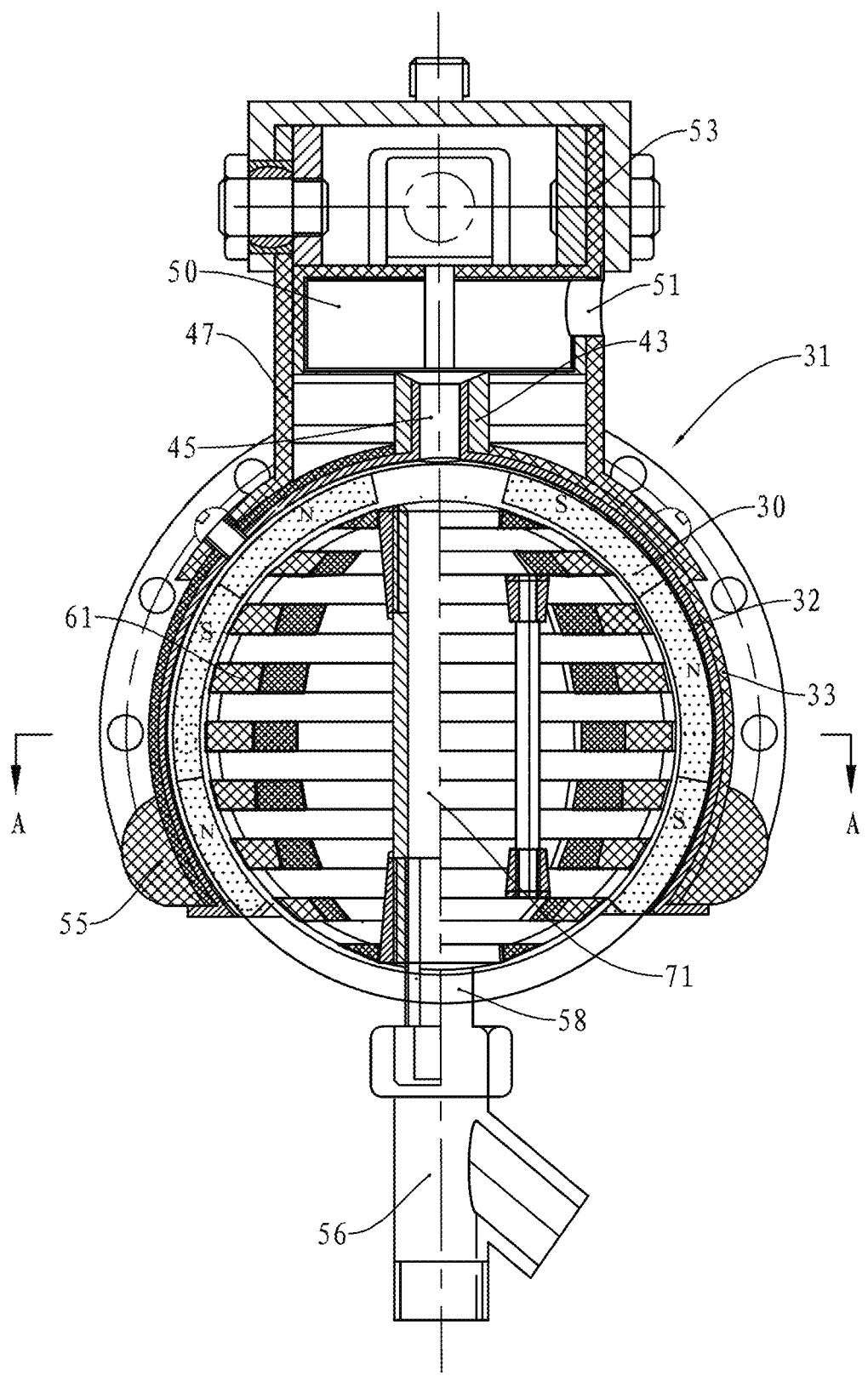
FIG. 5 is a cross-sectional view of the first embodiment of the ball joints universal rotary motor with a pump assembly.

As shown in FIG. 4 and FIG. 5, the motor further comprises a spherical-cap shaped stator body 30. The stator body is made from a permanent magnet, and is magnetized to form a plurality of magnetic poles. During its application, the permanent magnet may be magnetized to form eight or sixteen magnetic poles as needed. The stator body 30 is not necessarily a single permanent magnet, as the stator body may comprise multiple pieces of permanent magnets, with each piece of permanent magnet being magnetized to form one or more magnetic poles as needed. This would allow easy achievement of the magnetization of the permanent magnet and convenient manufacture of the stator body.

Figure 6:
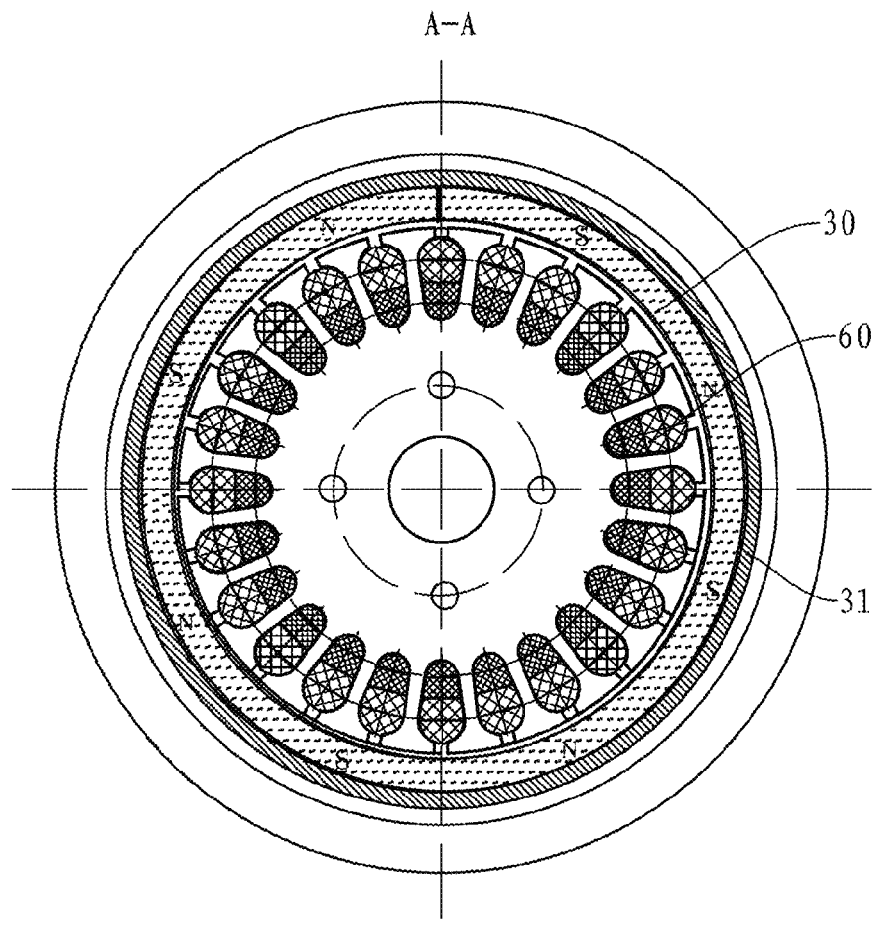
FIG. 6 is a cross-sectional view in the A-A plane of the first embodiment of the ball joints universal rotary motor with a pump assembly in FIG. 5.

As shown in FIG. 5 and FIG. 6, the plurality of magnetic poles of the stator body 30 are spaced in alternation in the circumferential direction of different planes, which allows the rotor body to move in different directions, including rotating along the axis of the stator body or tilting.

The stator body 30 is housed within the housing 31. The housing 31 comprises a magnet yoke 32 made of magnetic material, and a shielding layer 33. The magnet yoke 32 is outside the stator body 30. The stator body 30 can be securely connected with the housing 31 by bonding an outer wall of the stator body 30 to an inner wall of the magnet yoke 32.

The shielding layer 33 is made of aluminum, an aluminum alloy or other metals. The shielding layer 33 shields and absorbs the external magnetic field to avoid not only any impact of the external magnetic field on the rotor body, but also any impact on the external magnetic field from the magnetic field generated by the rotor body. The shielding layer 33 may be formed by dual-injection molding over the magnet yoke 32, therefore the shielding layer 33 is securely connected with the magnet yoke 32.

Figure 7:
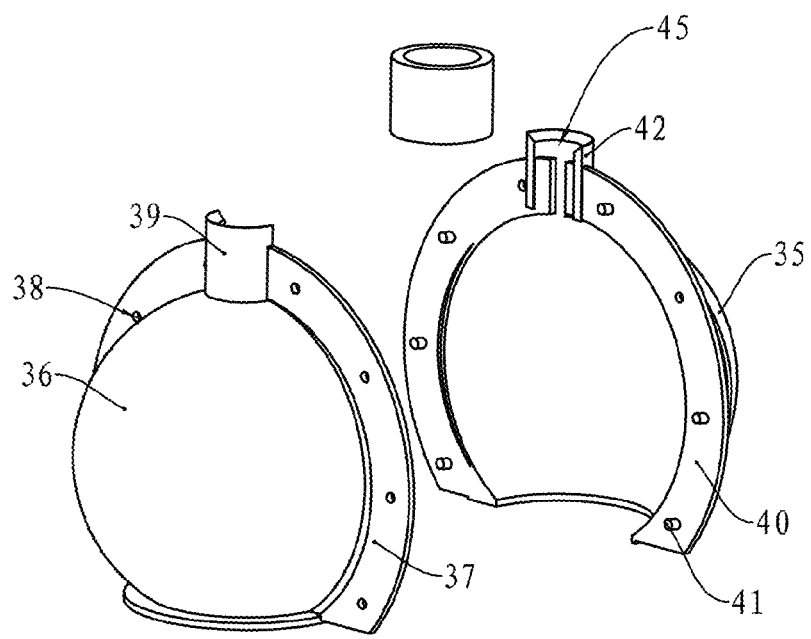
FIG. 7 is a structural explosion view of a stator body and a housing of the first embodiment of the ball joints universal rotary motor with a pump assembly.

As shown in FIG. 7, in order to facilitate the manufacture and assembly of the stator body 30 and the housing 31, the stator body 30 and the housing 31 respectively comprises two shell bodies 35 and 36 of spherical-cap shapes. A plate piece 37 forms by extending from an edge of the shell body 36 outwards in a radial direction. The plate piece 37 is provided with multiple through holes 38. An upper end of the plate piece 37 is provided with a half cylindrical shaped body 39.

Accordingly, a plate piece 40 forms by extending from an edge of the shell body 35 outwards in a radial direction. The plate piece 40 is provided with a plurality of lugs 41. An upper end of the plate piece 40 is provided with a half cylindrical shaped body 42. When the shell body 35 and shell body 36 are aligned, the plate piece 37 and plate piece 40 are also connected; the lugs 41 are respectively inserted into the through holes 38 to realize the fixed connection between the shell bodies 35 and 36. When the two half cylindrical shaped bodies 39 and 42 are connected to form an air inlet 45, external air enters into the housing 31 through the air inlet 45.

As shown in FIG. 4 and FIG. 5, a pump holder 47 is provided above the air inlet 45. A pump assembly 50 is mounted within the pump holder 47. An end of the pump assembly 50 is provided with an intake port 51. A bottom of the pump assembly 50 is in communication with the air inlet 45. Air enters through the intake port 51 into the pump assembly 50, is compressed into high pressure air by the pump assembly 50, and flows into the housing 31 through the air inlet 45.

A cross shaft locking ring 53 is amounted on a top of the pump assembly 50, and is configured to secure the pump assembly 50 on the housing 31. The cross shaft locking ring 53 is connected with the pump holder 47 through a plurality of screws 54.

As shown in FIG. 5, an annular projection 55 is provided on the housing 31 at a notch that is close to the stator body 30. The annular projection 55 extends in a circumferential direction along the stator body 30 on an outer wall of the housing 31, and as such the annular projection 55 increases the strength of the housing 31 around the notch that is close to the stator body 30, which protects the housing 31 from damages and extends the motor life.

Figure 8:
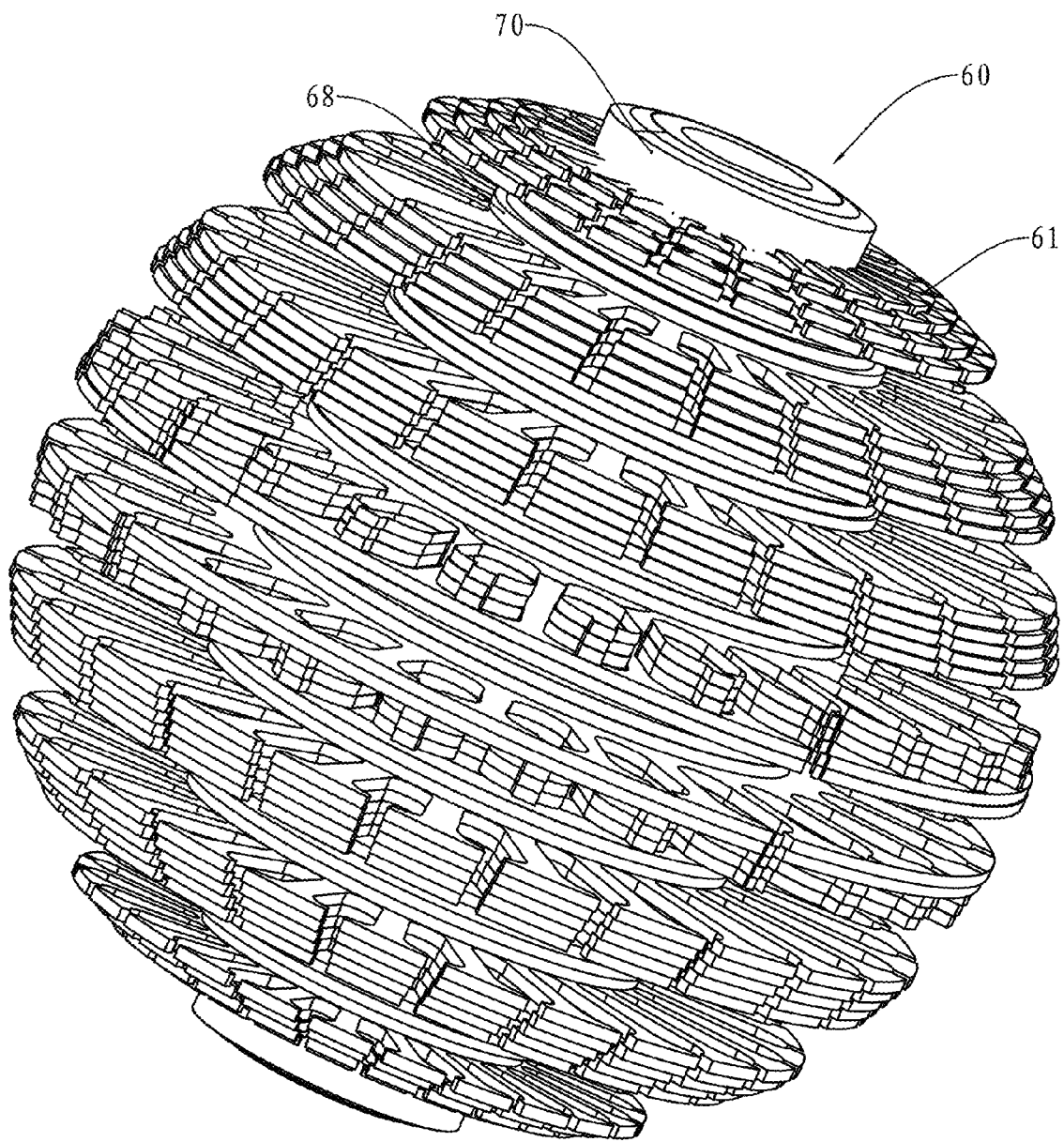
FIG. 8 is an enlarged structural view of a rotor body of the first embodiment of the ball joints universal rotary motor with a pump assembly.
Figure 9:
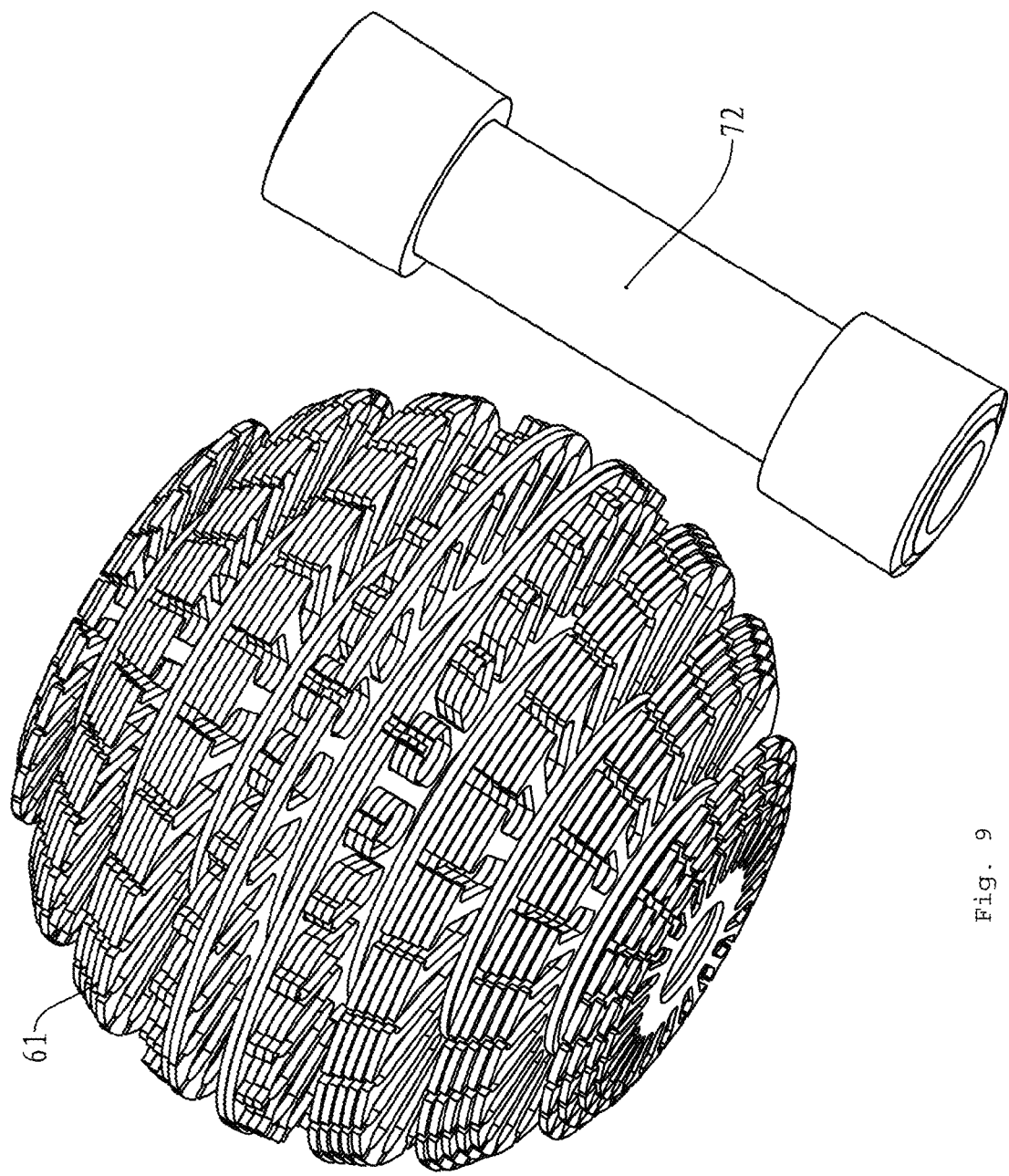
FIG. 9 is a structural explosion view of the rotor body of the first embodiment of the ball joints universal rotary motor with a pump assembly.
Figure 12:
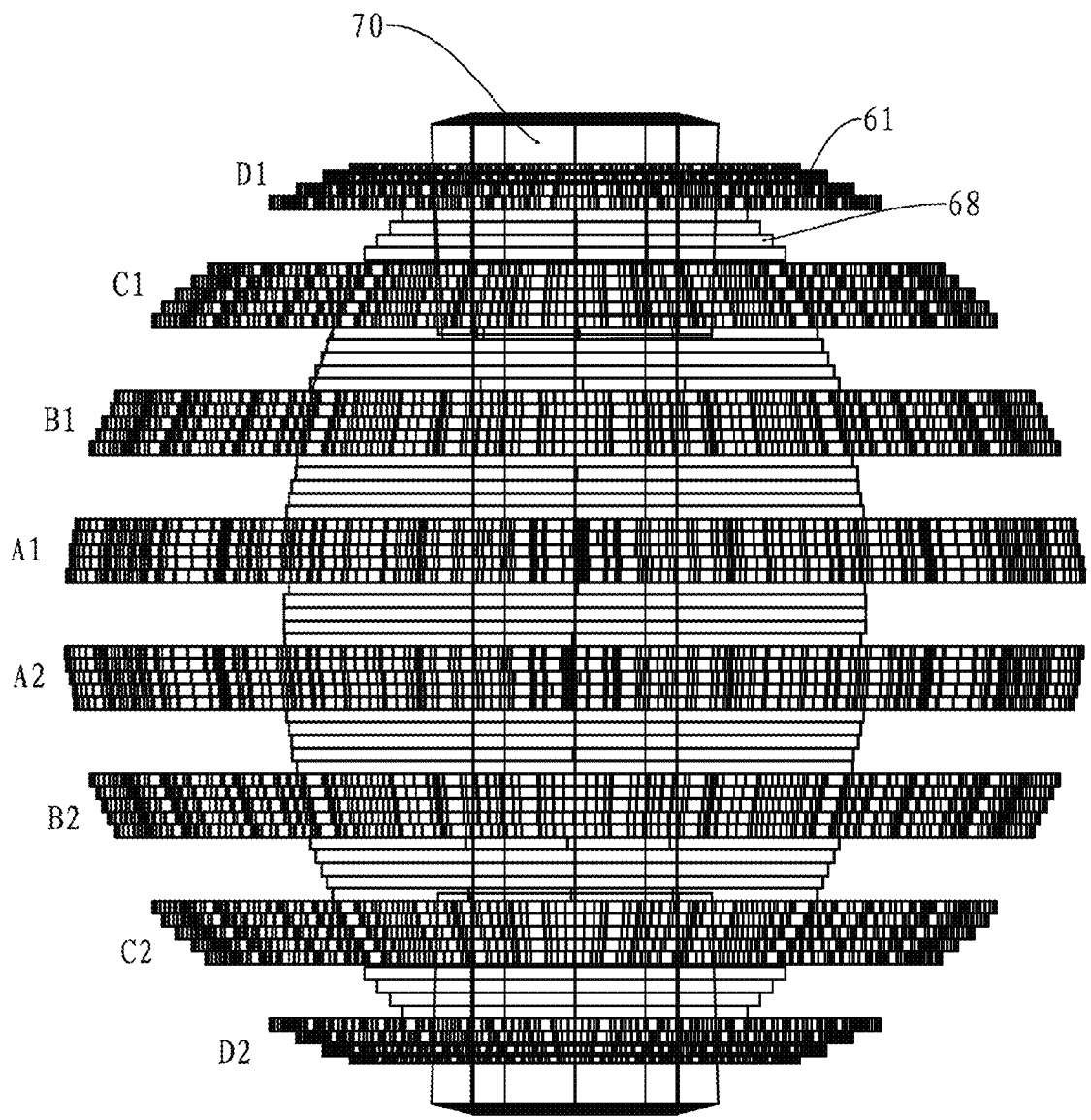
FIG. 12 is a structural view from another angle of the rotor body of the first embodiment of the ball joints universal rotary motor with a pump assembly.

A spherical shaped rotor body 60 is provided within the stator body 30, as shown in FIG. 8 and FIG. 9. The rotor body 60 comprises multiple layers of armatures; wherein each layer of the armatures comprises a rotor core 61. A rotor core 61 comprises stacked multiple layers of silicon steel laminations. A spacer layer 68 is provided between two adjacent rotor cores. The multiple layers of armatures are symmetrically distributed around the axis of the rotor body 60. As shown in FIG. 12, in the embodiment, a rotor body 60 comprises eight layers of armatures; wherein the corresponding rotor cores of the eight layers of armatures are respectively D1, C1, B1, A1, A2, B2, C2 and D2; wherein A1 and A2 are symmetrically distributed and are in equal distance from a center of the rotor body; B1 and B2 are symmetrically distributed and are in equal distance from a center of the rotor body; C1 and C2 are symmetrically distributed and are in equal distance from a center of the rotor body; D1 and D2 are symmetrically distributed and are in equal distance from a center of the rotor body; the pair of symmetrically distributed rotor cores are of the same size. The diameters of the rotor cores 61 of the multiple layers of armatures gradually decrease from a center of the rotor body 60 toward the two ends.

Figure 11:
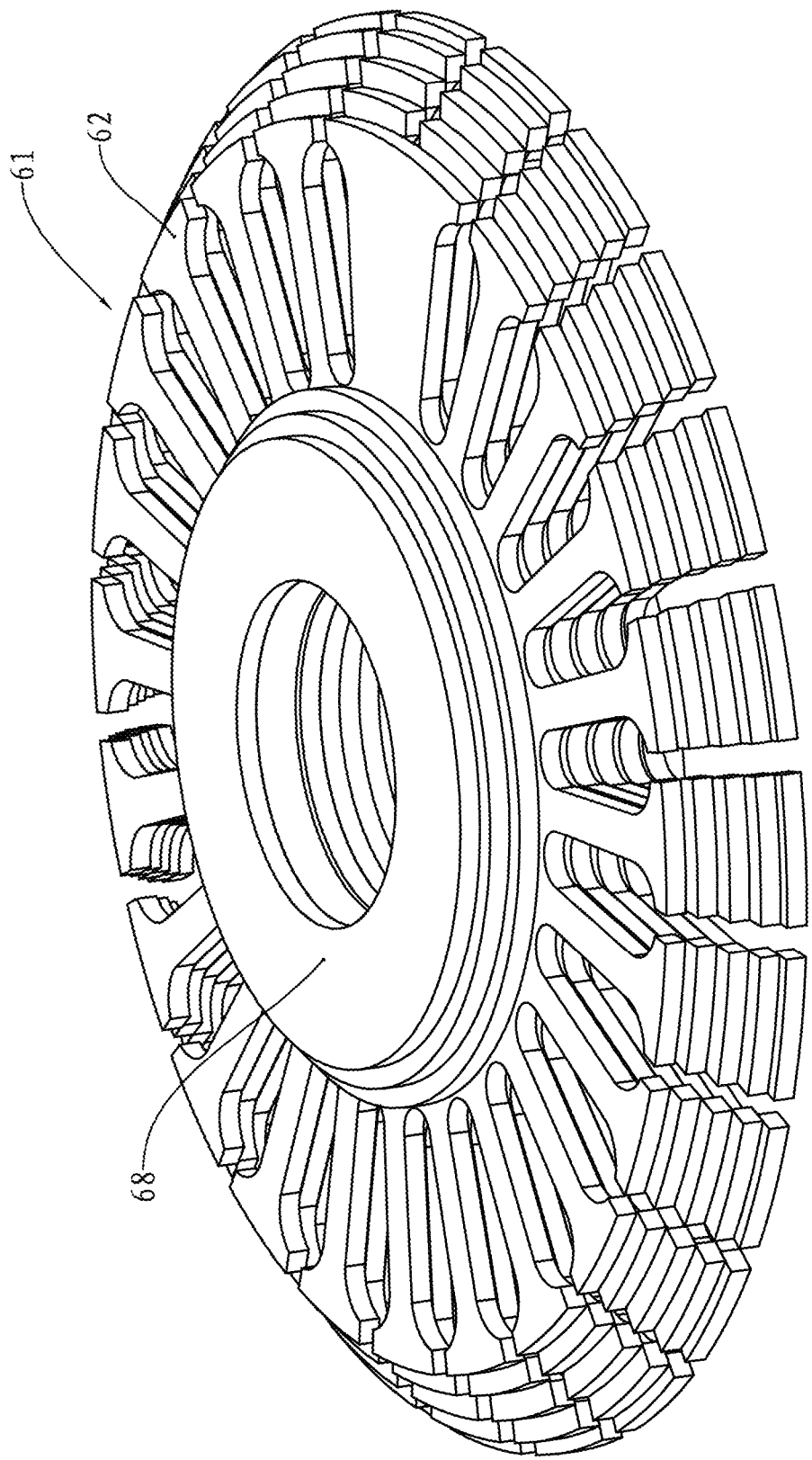
FIG. 11 is an enlarged structural view of a rotor core of a layer of armature of the rotor body and spacer layers of the first embodiment of the ball joints universal rotary motor with a pump assembly.

As shown in FIG. 11, the diameters of the multiple layers of silicon steel laminations 62 of the rotor core 61 in each layer of armature are different. As shown in FIG. 12, the diameters of the multiple layers of silicon steel laminations 62 of the rotor core 61 in each layer of armature decrease from a center of the rotor body 60 toward the two ends direction, and as such, the rotor body 60 is essentially of a spherical shape.

Figure 13:
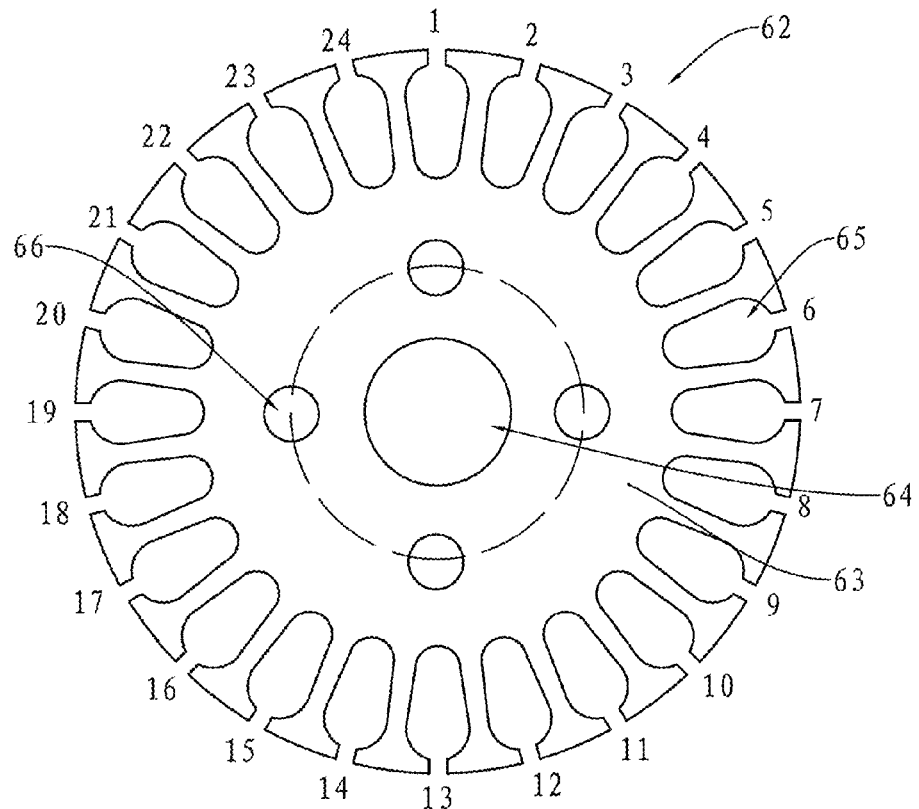
FIG. 13 is a structural view of a silicon steel lamination of the first embodiment of the ball joints universal rotary motor with a pump assembly.

As shown in FIG. 13, each silicon steel lamination 62 of the rotor core 61 is essentially of an annular shape, with a circular through hole 64 at its center. Multiple layers of silicon steel laminations are stacked to form the rotor core 61, and the through holes 64 form a bolt hole. The through holes are surrounded by the magnet yoke portion 63 of the silicon steel lamination 62. Multiple winding slots 65 are provided in the circumferential direction of silicon steel lamination 62 at the outer edge of the magnet yoke portion. Each groove of the winding slots 65 is set to have an opening facing outwardly. Multiple positioning holes 66 are provided on the magnet yoke portion 63. After the rotor core 61 is formed by stacking, the multiple layers of silicon steel laminations 62 are securely connected by pins passing through the aligned positioning holes 66.

The spacer layer 68 as provided between two rotor cores 61 is also formed by stacked multiple layers of silicon steel laminations. The diameter of the silicon steel laminations of a spacer layer 68 is smaller than the diameter of the silicon steel laminations of an adjacent rotor core 61. A spacer layer 68 is also provided with a through hole at its center. A spacer layer 68 does not comprise winding slots, and a spacer layer 68 is not wound with coils.

Figure 10:
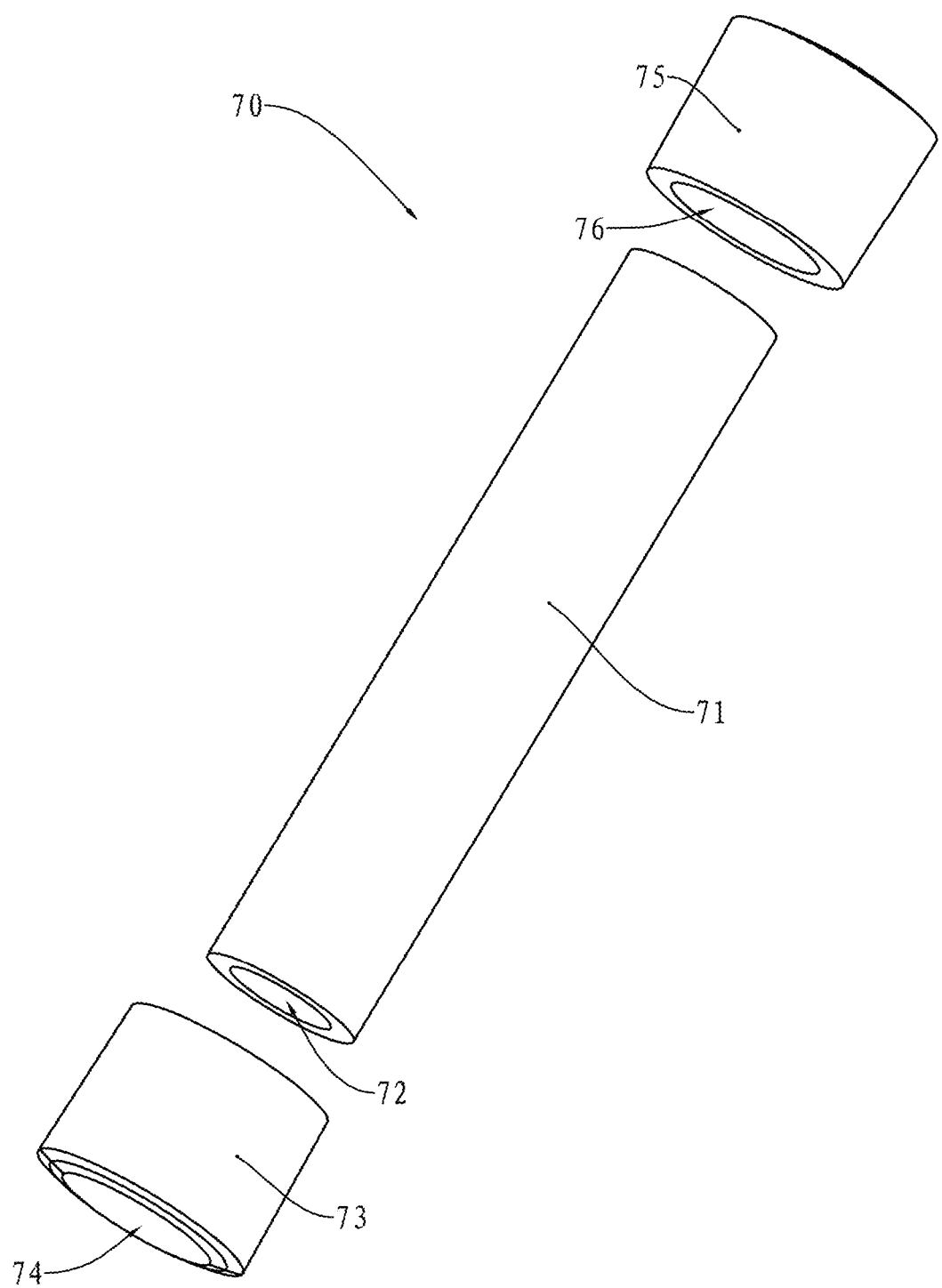
FIG. 10 is a structural explosion view of a bolt and nuts of the rotor body of the first embodiment of the ball joints universal rotary motor with a pump assembly.

As shown in FIG. 8, the multiple layers of rotor core 61 and the multiple spacer layers 68 are connected by a bolt 70. As shown in FIG. 10, the bolt 70 comprises a cylindrical screw rod 71, which has external threads on the outer walls of both ends (not shown in FIG. 10). The screw rod 71 comprises a through hole 72 at its center through the screw rod 71 all the way to its two ends. Two ends of the screw rod 71 are respectively provided with nuts 73 and 75, with each nut in a frustum shape. A cross-sectional area of the nut 73 or 75 increases from the end close to a center of the rotor body 60 to the other end at the outside direction. As such, the cross-sectional area of the nut 73 or 75 at the end closer to the center rotor body 60 is smaller than the cross-sectional area at the end further away.

An inner wall of the nut 73 or 75 is provided with internal threads, which match the external threads on screw rod 71. Therefore the nut 73 or 75 is configured to be securely connected with the ends of crew rod 71. The nuts 73 and 75 are also provided with through holes 74 that pas through the two ends of the nut 73 or 75 respectively. Thus, the bolt 70 has an axial through hole that pass through its two end surfaces.

The multiple layers of rotor cores 61 of the rotor body 60 and the spacer layers 68 are configured to be securely connected by the bolt 70. The bolt 70 is configured to pass through the screw holes in the rotor core 61 of each layer of armature and the spacer layers 68. Because the two nuts 73 and 75 of the bolt 70 are of frustum shapes, during assembly of rotor body 60, after rotor cores 61 of each layer of armature and its spacer layer are aligned on the screw rod 71, the nuts 73 and 75 are screwed on the two ends of screw rod 71; then multiple layers of rotor cores 61 are securely connected with the crew rod 71, realizing self-lock of the rotor core 61.

If the diameter of the rotor core 61 is relatively large, in another word, if the area of the rotor core 61 is large, then multiple bolts may be used to connect the multiple rotor cores 61 by passing through the multiple layers of rotor cores 61 and multiple spacer layers 68.

Figure 14:
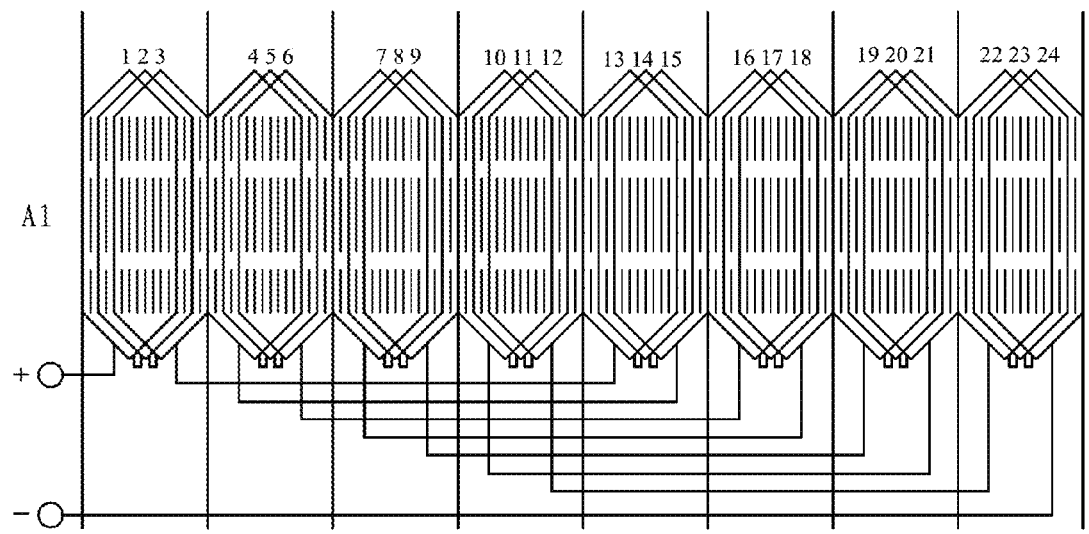
FIG. 14 is an expanded view of a first layer of coils on a layer of armature in the rotor body of the first embodiment of the ball joints universal rotary motor with a pump assembly.

In the embodiment, two layers of coils are configured to wind around each rotor core 61 of each layer of armature, with the first layer of coils wound around the winding slots of the rotor core 61 on the same layer of armature. As shown in FIG. 14, in the present embodiment, the rotor core 61 comprises a total of 24 coils and eight poles. The rotor core 61 has twenty-four wound coils, wherein a first coil is wound around the groove 1 and the groove 3; a second coil is wound around the groove 2 and the groove 4; a third coil is wound around the groove 3 and the groove 5, and so on and so forth; in another word, each coil is wound around the two grooves that have one groove spaced in between. The coil that is wound around the groove 1 and the groove 3 is connected with the coil that is wound around the groove 13 and the groove 15, and so one and so forth. The winding method of coils on each layer is similar to that of an existing ordinary asynchronous AC motor.

When each of the first layer of coils of the eight layers of armatures is energized, each coil of each layer of armature generates a rotating magnetic field, which rotates with respect to the magnetic field generated by the stator body 30. Accordingly, the rotor body 60 rotates with respect to the stator body 30. The rotor body 60 rotates along the axis of the bolt 70. The eight layers of armatures work in a way equivalent to eight planar motors in this mode.

Figure 15:
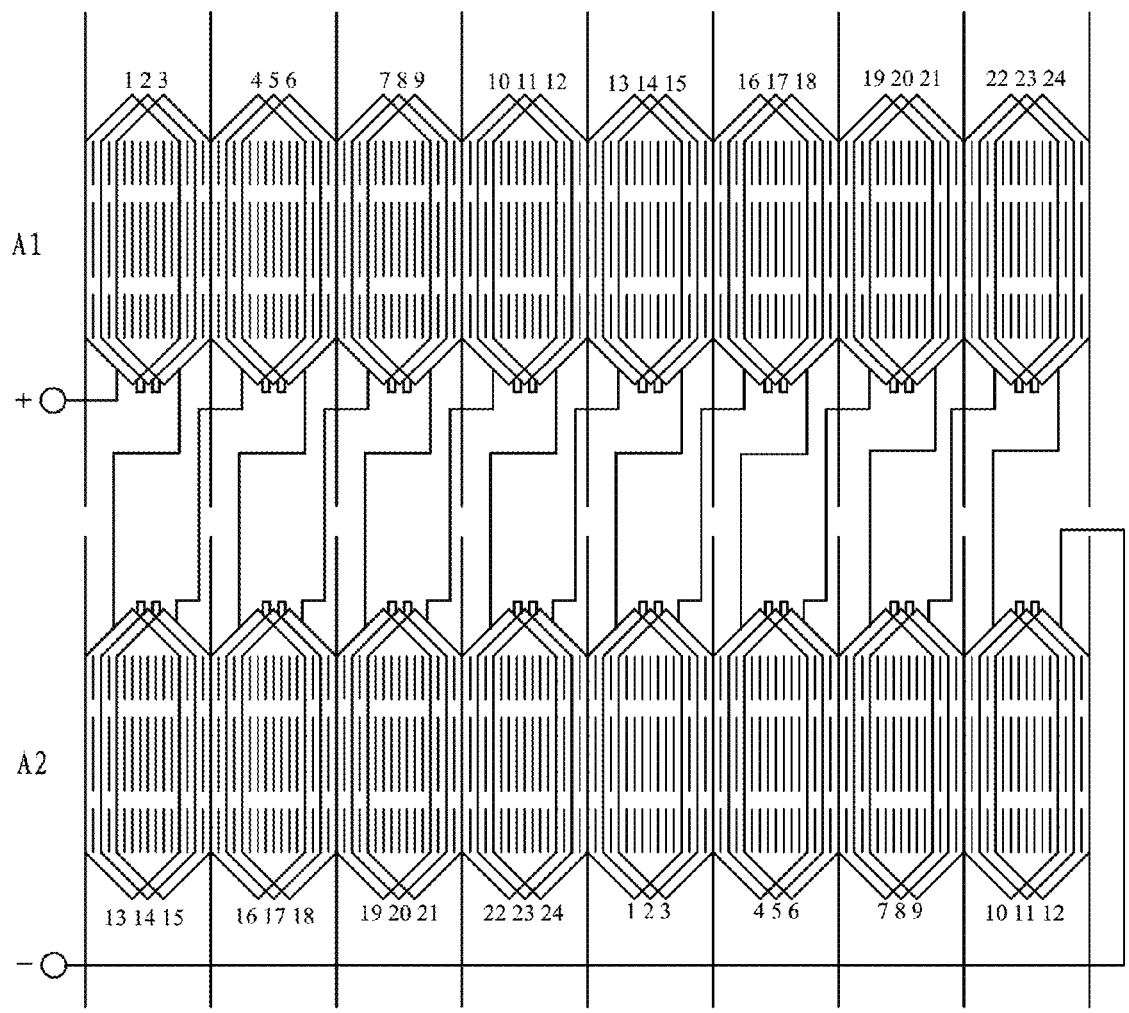
FIG. 15 an expanded view of a second layer of coils on two symmetrically distributed layers of armatures in the rotor body of the first embodiment of the ball joints universal rotary motor with a pump assembly.

A second layer of coils is configured to be wound around the rotor cores 61 of the eight layers of armatures. As shown in FIG. 15, the second layer of coils that is configured to be wound on the same layer of armature also comprise twenty-four coils; for example, a first coil on the armature A1 is wound around a groove 1 and groove 3; a second coil is wound around a groove 2 and a groove 4; a third coil is wound around a groove 3 and a groove 5, and so on and so forth; in another word, each coils is wound around the two grooves that have one groove spaced in between.

However, in the second layer of coils, the coil that is wound on the groove 1 and the groove 3 of the armature A1 is not connected with the coils that is wound on the groove 13 and the groove 15 of the same armature A1, but is connected with the coil that is wound on the groove 13 and the groove 15 of the armature A2; similarly, the coil that is wound on the groove 4 and the groove 6 of the armature A1 is connected with the coil that is on the groove 16 and groove 18 of the armature A2, and so on and so forth; in another word, a coil wound on a layer of armature is connected with a coil wound on a symmetrically distributed armature that is in equal distance from a center of the stator body.

When the second layer of coils is energized, the two symmetrically arranged armatures generate a rotating magnetic field; the magnetic field rotates around the stator body 30 in a direction that tilts with respect to the axis of the stator body 30. If the axis of the stator body is Z-axis, a plane that is perpendicular to Z and passes through the center of rotor body 60 is a XOY plane, then when the first layer of coils is energized, rotor body 60 rotates around the Z-axis; when the second layer of coils is energized, rotor body 60 tilts with respect to Z-axis, and rotates in a XOZ plane or a YOZ plane.

As each second layer of coils on a layer of armature is electrically connected with another second layer of coils on a symmetrically distributed armature, the magnetic field generated on each layer of armature accumulates to generate a stronger power to promote the rotation of the rotor body 60.

In other embodiments, the winding of coils may vary in many ways. In one example, the armature A1 and A2 are wound with only a first layer of coils, and the armature B1 and B2 are wound with only a second layer of coils. In other examples, when a second layer of coils on the armature A1 and A2 is energized, the rotor body 60 is configured to rotate in a XOZ plane. Or when a second layer of coils on the armature B1 and B2 is energized, the rotor body 60 is configured to rotate in a YOZ plane. Or when a second layer of coils on the armature C1 and C2 is energized, the rotor body 60 is configured to rotate in a plane that is at a 45° angle with respect to the XOZ plane. By energizing a second layer of coils on different armatures, the motor is configured to rotate at different directions.

As the bolt 70 is provided with the through hole in the middle, and the spacer layer 68 is provided with a through hole along the radial direction of the rotor core 61, that is, the through hole of the spacer layer 68 is perpendicular to the through hole of the bolt 70. As such, a connection cord that connects different coils may pass through the through hole of a spacer layer 68 or the through hole of the bolt 70. As such the connection cord does not fly off the surface of the rotor body 60 during the rotation of the rotor body, which protects the connection cord. In addition, a protection layer such as a heat shrink tube may be used outside the connection cord to prevent damages.

As shown in FIG. 4 and FIG. 5, a bottom of the rotor body 60 is provided with a rotor body shaft 58. The rotor body shaft 59 is securely connected with the bolt 70. The rotation of the rotor body 60 drives the rotation of the rotor body shaft 58, and as such outputs power. Additionally, the bottom of rotor body 60 is provided with a signal control line 56; wherein the line 56 is a tube with three openings; the power lines of the rotor body 60 and signal control lines are all electrically connected through the line 56 with the external power lines and control chips etc.

Figure 16:
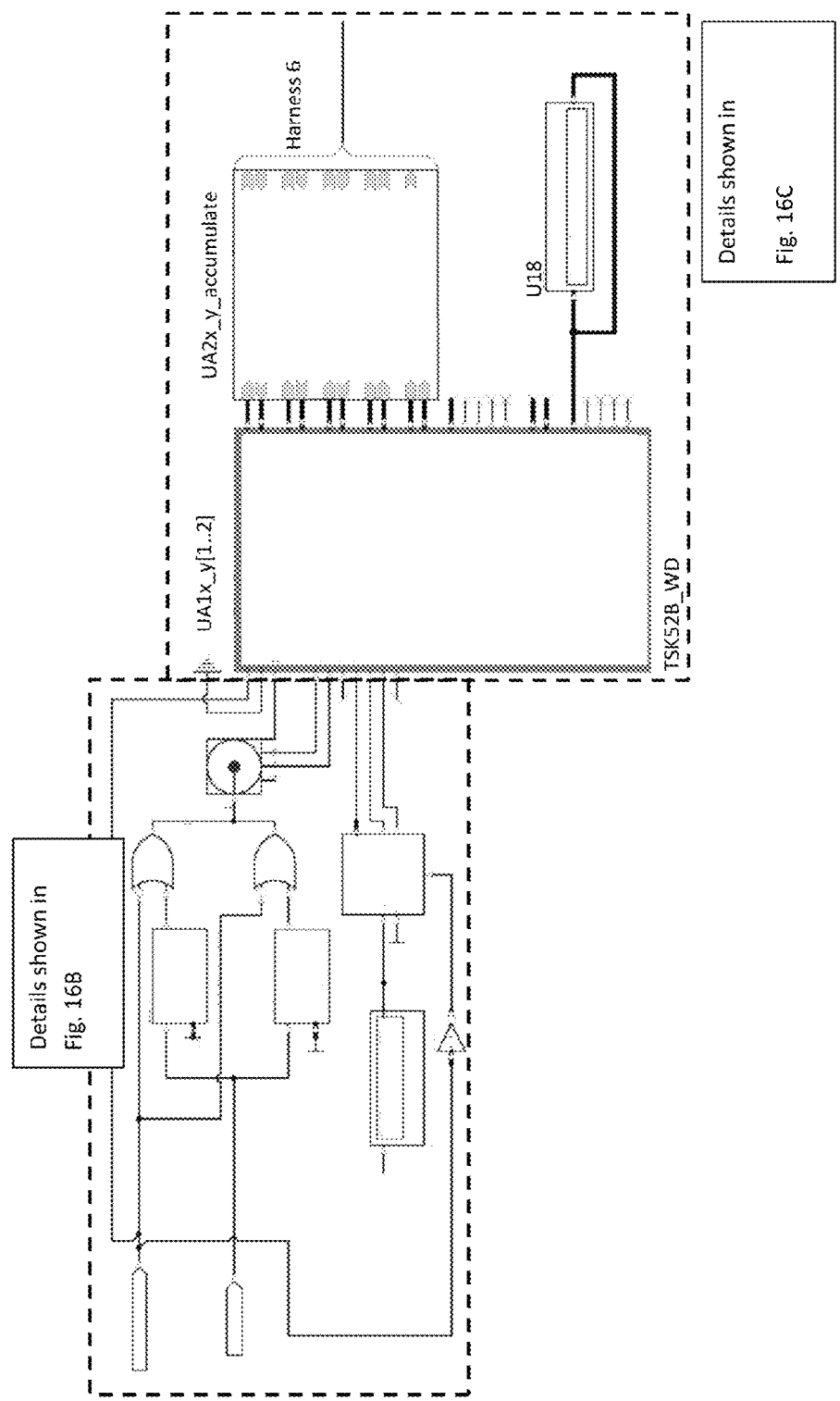
FIG. 16A is a general view of the schematics of a control circuit of the first and second embodiments of the ball joints universal rotary motor.
FIG. 16B to 16G are detailed view of the schematics of a control circuit of the first and second embodiments of the ball joints universal rotary motor.
Figure 16B:
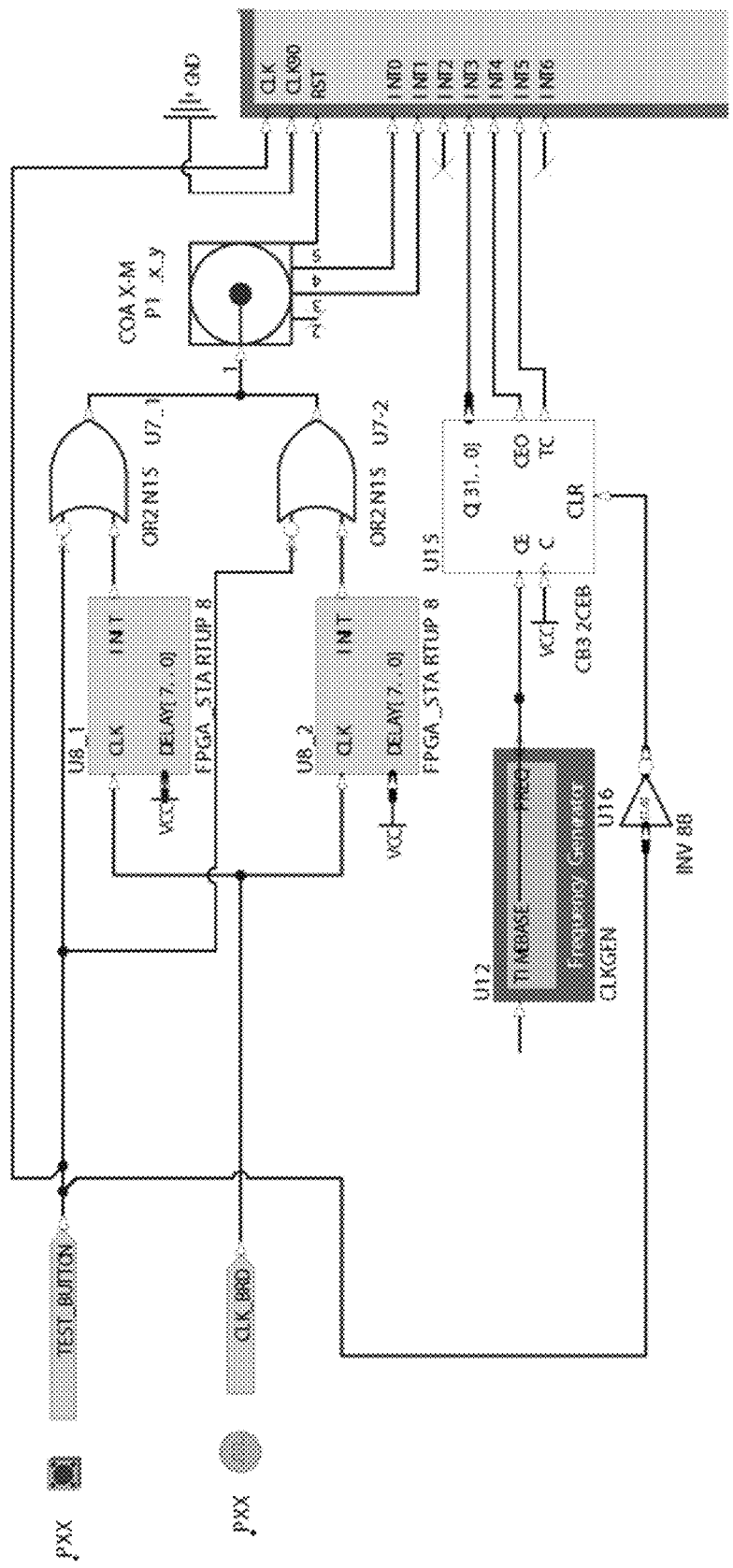
Figure 16C:
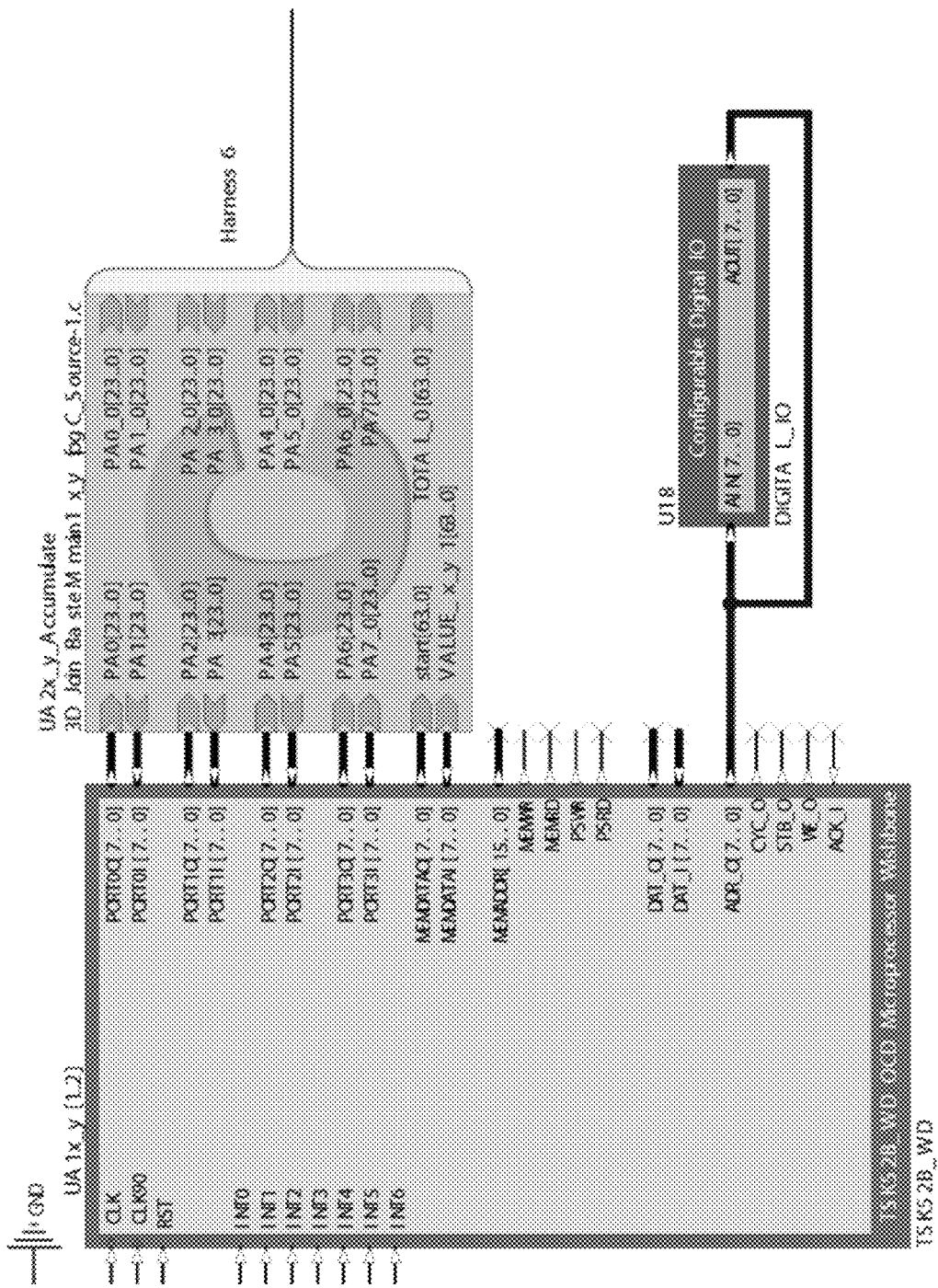
Figure 16:
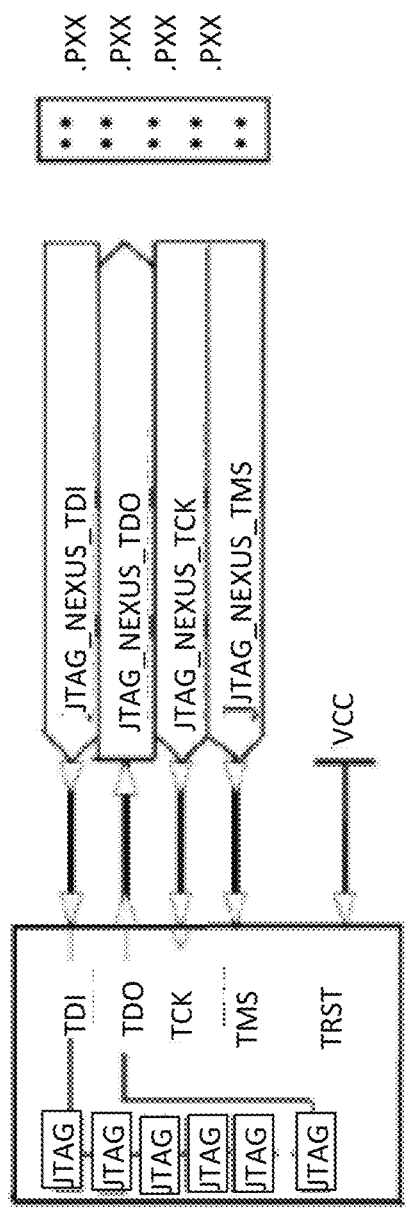
Figure 16E:
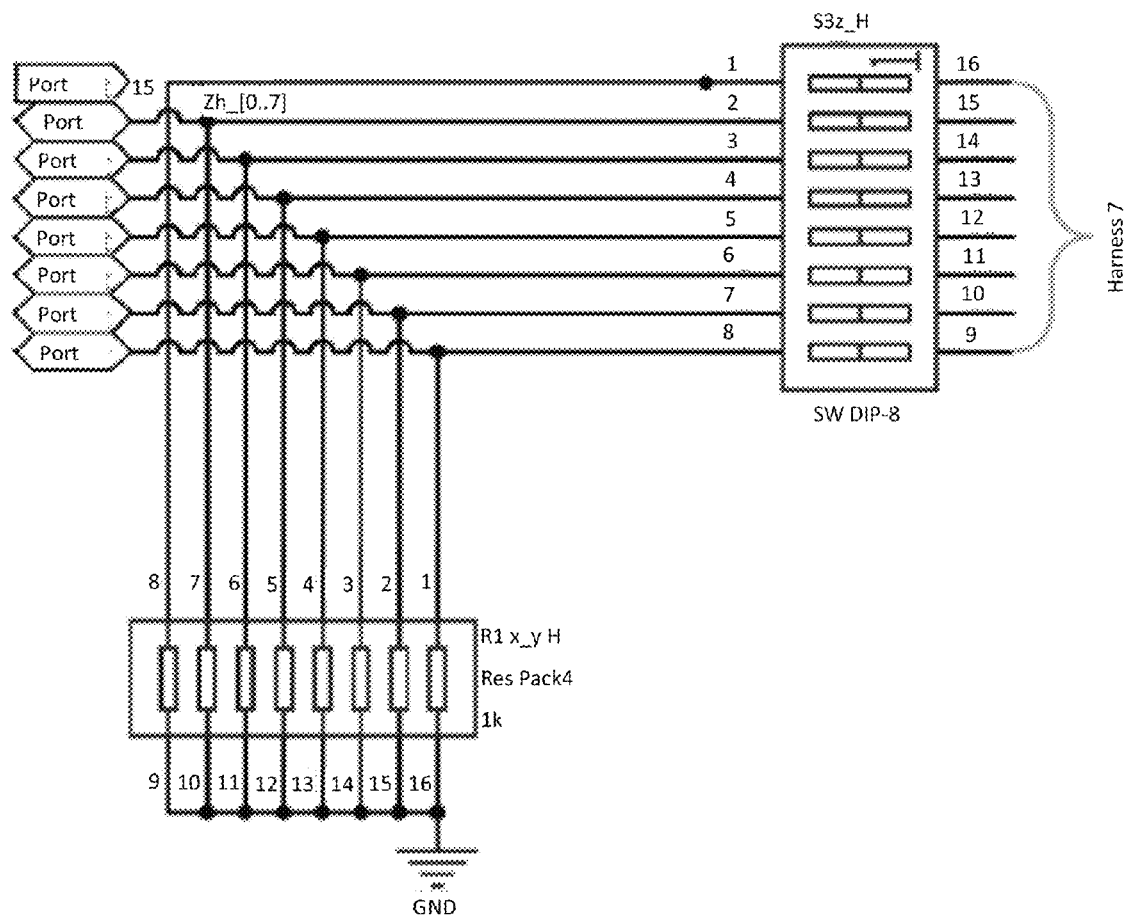
Figure 16:
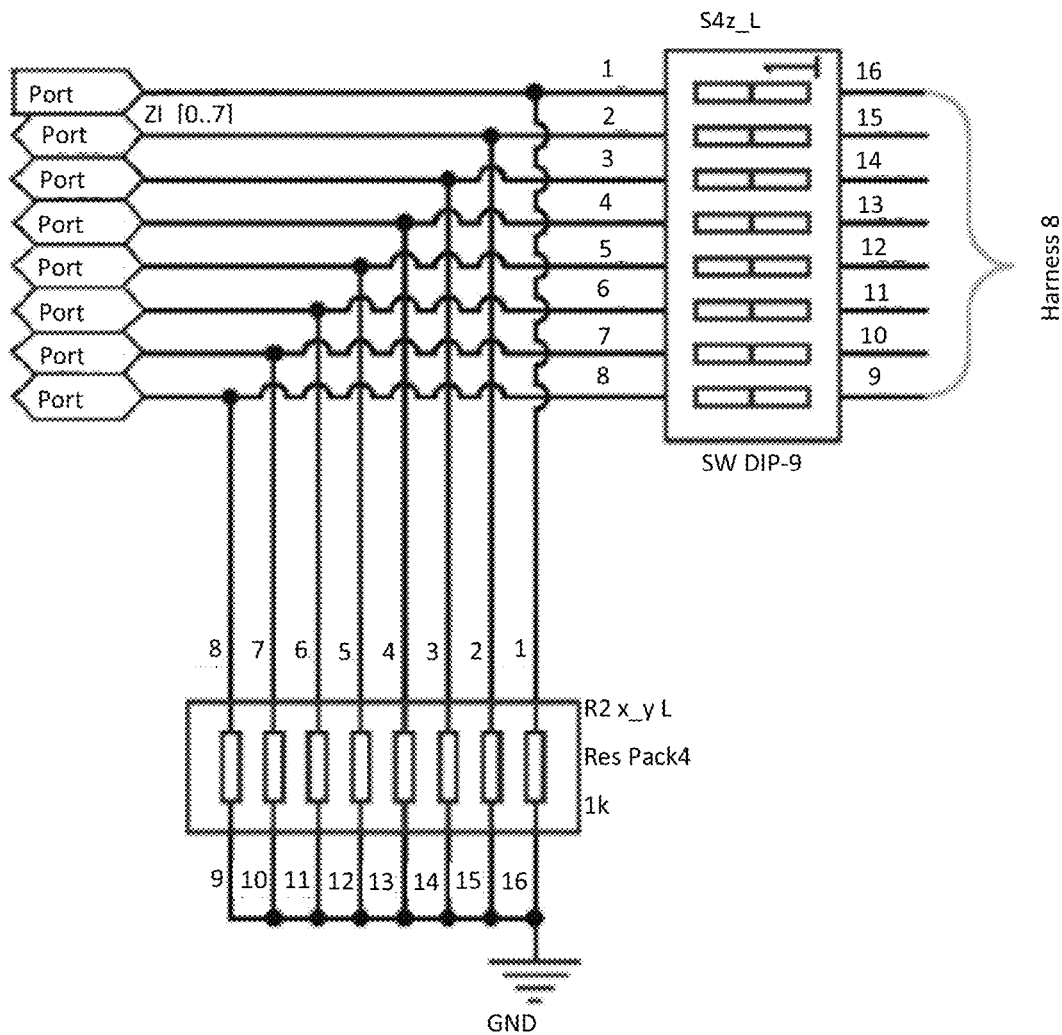
Figure 16:
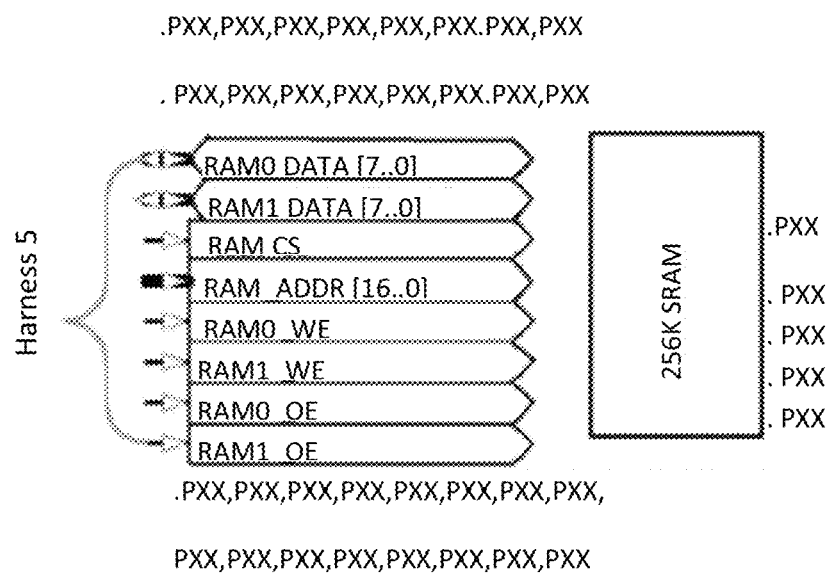
Figure 17:
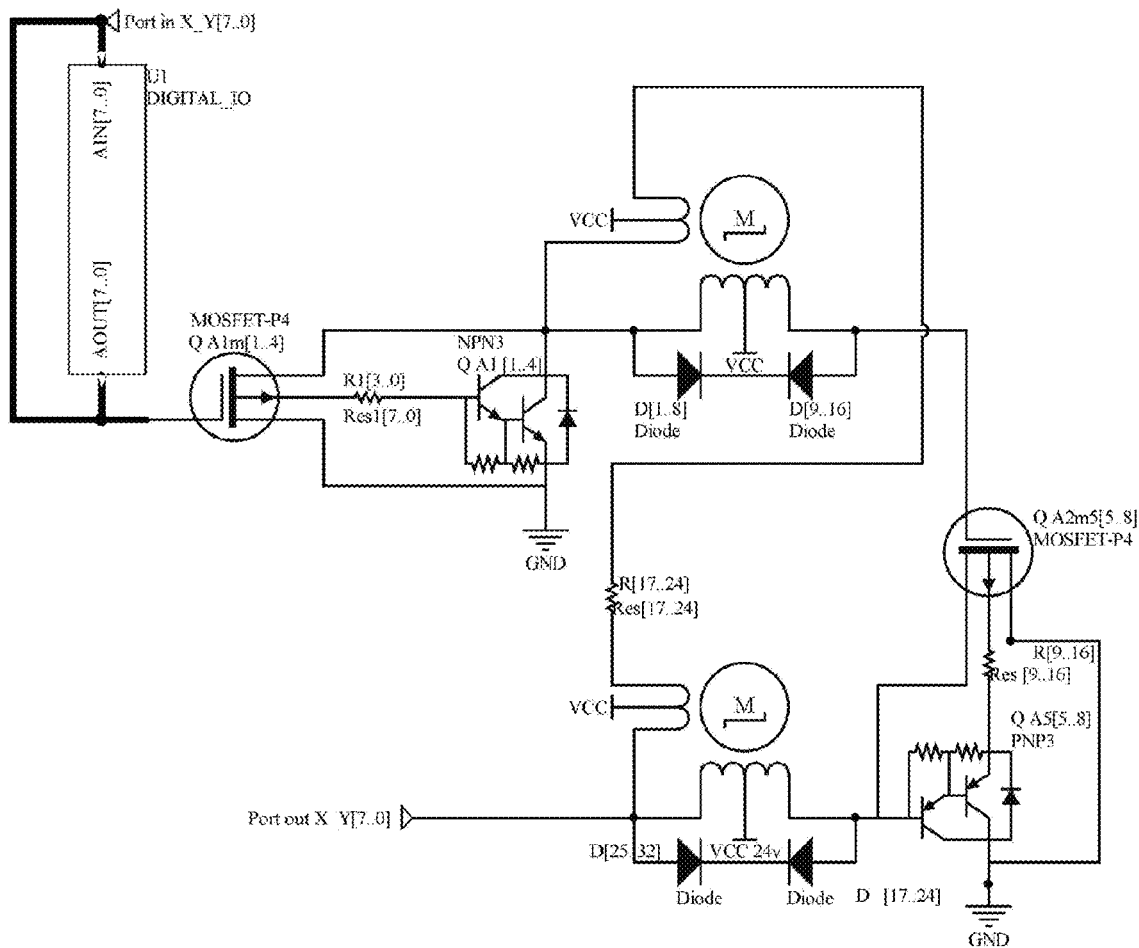
FIG. 17 is schematics of a control circuit of the first layer of coils of the first and second embodiments of the ball joints universal rotary motor.

As shown in FIG. 16, a control circuit is provided for each first layer of coils on each layer of armature. FIG. 17 shows an embodiment of the schemes of a control circuit of the first layer of coils. As shown in FIG. 17, a control chip outputs a control signal, such as a pulse signal with width modulation, to a power line, to control the shutoff of the power line; external power is introduced to the first layer of coils to realize the rotation or reverse rotation of the rotor body 60 with respect to the Z-axis.

Figure 18:
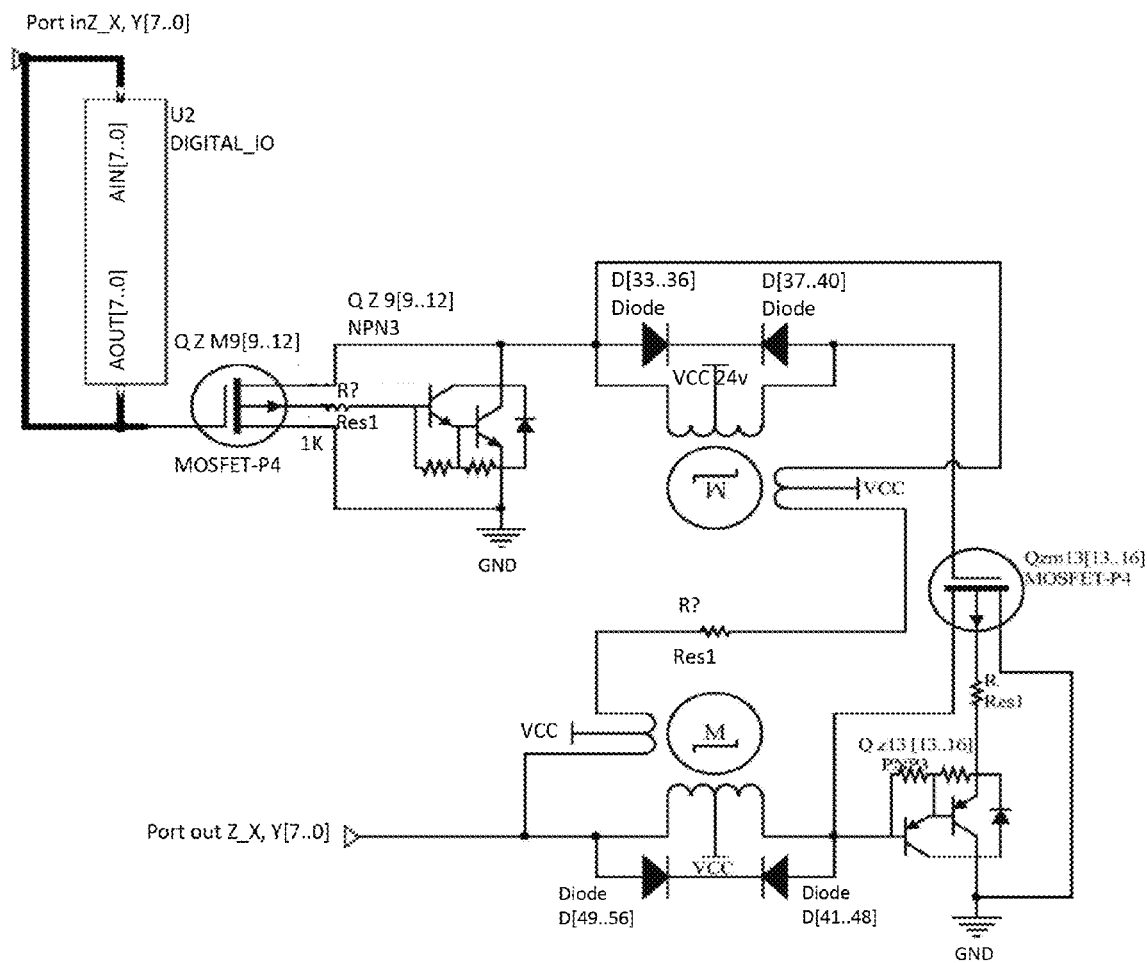
FIG. 18 is schematics of a control circuit of the second layer of coils of the first and second embodiments of the ball joints universal rotary motor.

The hardware configuration of the control circuit of the second layer of coils of each layer of armature is the same as that of the first layer of coils. FIG. 18 shows an embodiment of the schemes of a control circuit of the second layer of coils. As shown in FIG. 18, a control chip outputs a control signal to a power line, to realize the rotation or reverse rotation of the rotor body 60 in the XOZ plane or the YOZ plane.

Preferably, the disclosed ball joint universal rotary motor is a step motor, i.e., the motor rotates only at a small angle in each movement. By continuously outputting control signals, the first layer or the second layer of coils is continuously energized to realize the high speed rotation of the motor; the angle of rotation is adjusted by the length of time of the current, and the motor realizes rotation in all directions.

When manufacturing the disclosed ball joint universal rotary motor, first, magnetizing the permanent magnet into a plurality of magnetic poles, with the number of the poles determined based on the actual requirement. Next, manufacturing the housing of the motor, wherein the housing comprises two layers, an inner layer and an outer layer. The inner layer comprises a magnet yoke made of a magnetic material. The outer layer is a shielding layer made of aluminum or other metals. Next, securely connecting the stator body within the housing, for example, by bonding an outer wall of the stator body on an inner wall of the magnet yoke with a glue.

Next, manufacturing the rotor body by cutting silicon steel plate material into multiple silicon steel laminations with varying diameters, wherein each silicon steel lamination comprises a through hole at its center, and wherein each silicon steel lamination comprises multiple winding slots along its circumferential direction. Next, stacking the multiple silicon steel laminations to form a rotor core; the diameters of the multiple silicon steel laminations of a single rotor core either gradually increase or gradually decrease during stacking.

Next, manufacturing the spacer layers by cutting silicon steel plate material into multiple silicon steel laminations of spacer layers; wherein each spacer layer comprises a through hole at its center; wherein each spacer layer does not comprise winding slots along its circumferential direction; and wherein the diameter of a spacer layer is smaller than the diameter of the silicon steel laminations of the rotor core. Next, connecting the spacer layers and the multiple layers of rotor cores by a bolt, and screwing nuts on the rotor core to realize the securing of the multiple layers of rotor cores.

Next, finishing treating an outer surface of the rotor core with an automatic machine, so that the overall outer surface of the rotor core substantially approaches a spherical surface. Next, winding coils on the rotor core of each layer of armature, with two layers of coils wound on a layer of armature; wherein a first layer of coils is wound on a layer of armature, and the first layer of coils on the same layer of armature is electrically connected; wherein a second layer of coils is wound on one layer of armature, and the second layer of coils is electrically connected with another second layer of coils on a symmetrically distributed armature in equal distance from a center of the rotor body with respect to the one layer of armature.

Finally, securing the rotor body within an inside of the stator body, and installing a pump assembly on the housing to complete the manufacturing of the ball joint universal rotary motor.

A second embodiment of the present disclosure is provided below.

Figure 21:
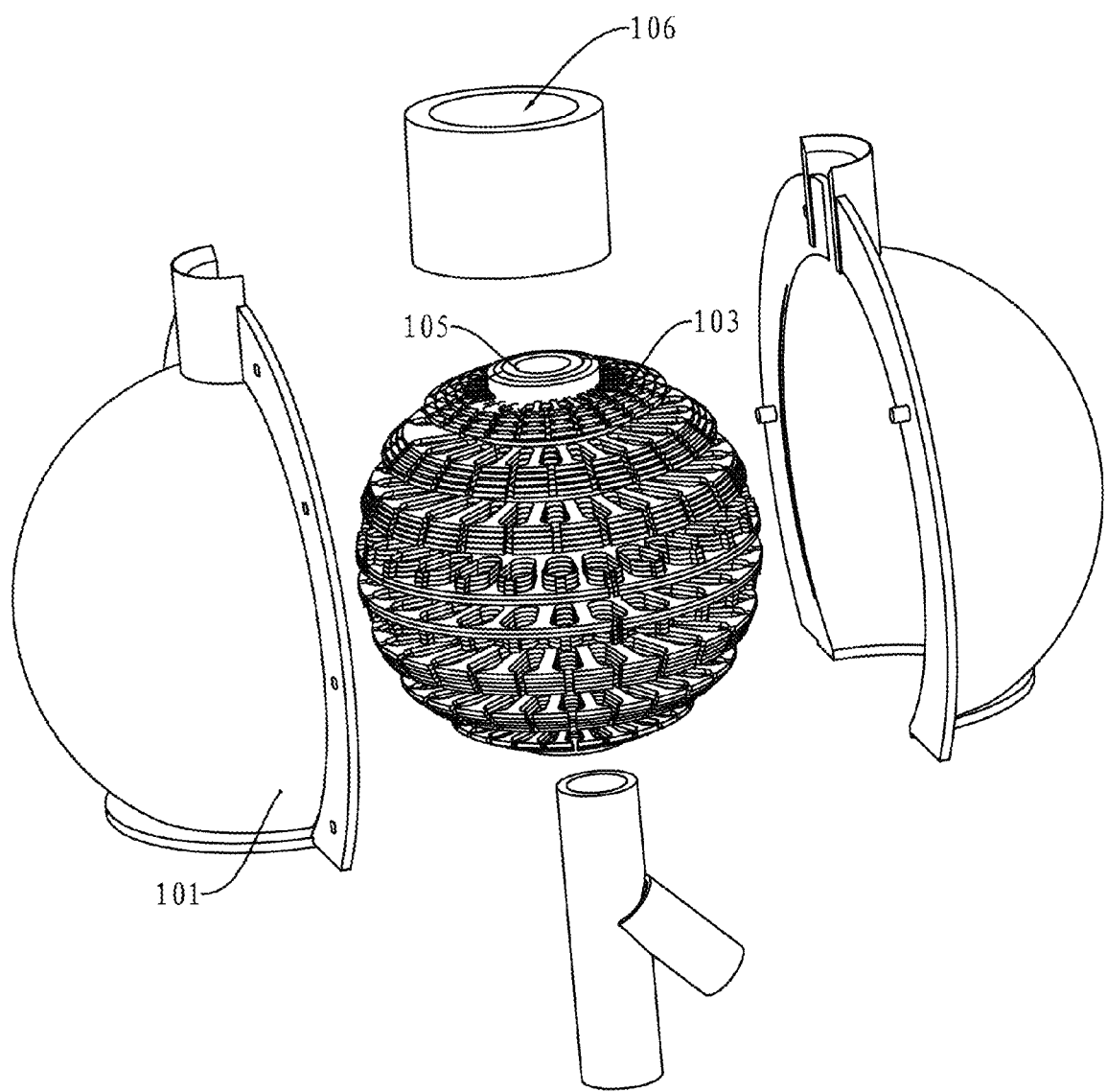
FIG. 21 is a structural explosion view of the second embodiments of the ball joints universal rotary motor without a pump assembly.

As shown in FIG. 19 to FIG. 21, a ball joints universal rotary motor 80 comprises a housing 101. The housing 101 comprises two half spherical-cap shaped shells. A stator body 102 is provided within the housing 101. The stator body 102 is formed from a magnetized permanent magnet with multiple magnetic poles.

A rotor body 103 is provided within the stator body 102. The rotor body 103, same as the rotor body in the first embodiment, comprises multiple layers of armatures 104. Each layer of the multiple layers of armatures comprises a rotor core made of multiple layers of silicon steel laminations. The rotor core is wound with two layers of coils. The winding method of the coils of the present embodiment is the same as the first embodiment. A rotor shaft 105 is provided in the rotor body 104. An air inlet 106 is provided at a top of the ball joints universal rotary motor 80. The air inlet 106 may be connected with an external air pipe, and high pressure air may enter from the external air pipe into the air inlet 106.

Figure 22:
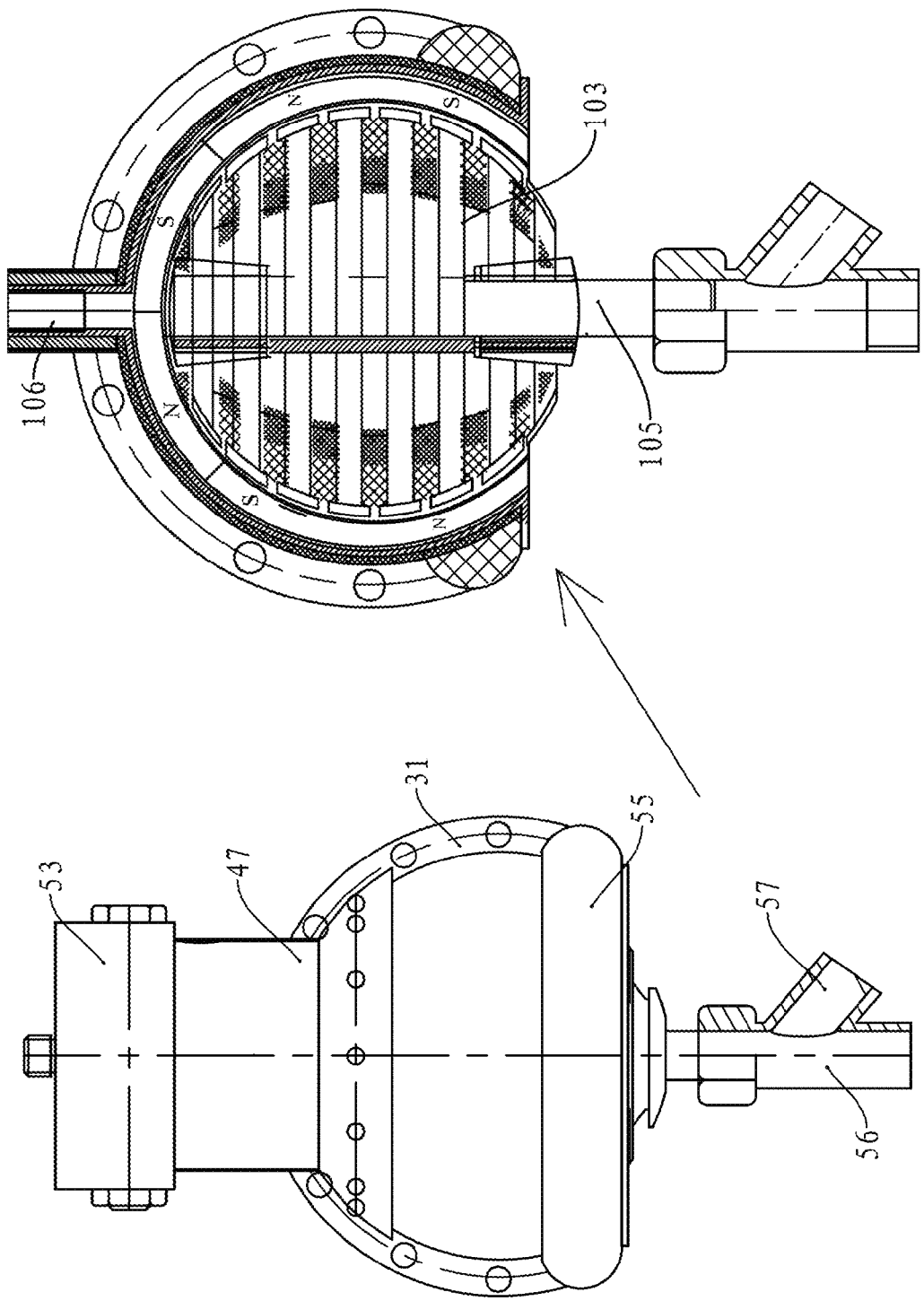
FIG. 22 is a comparison view of the first and second embodiments.

As shown in FIG. 22, the difference of the present embodiment and the first embodiment is that the present embodiment does not comprise a pump assembly. Therefore, the present disclosure provides one embodiment of a ball joints universal rotary motor with a pump assembly, and another embodiment of a ball joints universal rotary motor without a pump assembly.

One application of the present disclosure is as a drive motor on joints of a robot, such as an intelligent bionic robot. For example, by using the motor, a neck joint of a robot may realize three dimensional movements; and a shoulder joint of a robot may realize three dimensional movements without the requirement of two conventional motors. As such, the application of the present disclosure makes a bionic robot a reality. More vivid performance of a robot, such as those shown in the movie The Transformer, may be realized when various joints and areas in a robot, such as the lumbar spine, pelvis area and wrists, are installed with the ball joints universal rotary motor in order to achieve the full range of robotic limb movement.

Another application of the present disclosure includes various devices and military firearms, to achieve the multi-directional rotation of the firearms.

Figure 23:
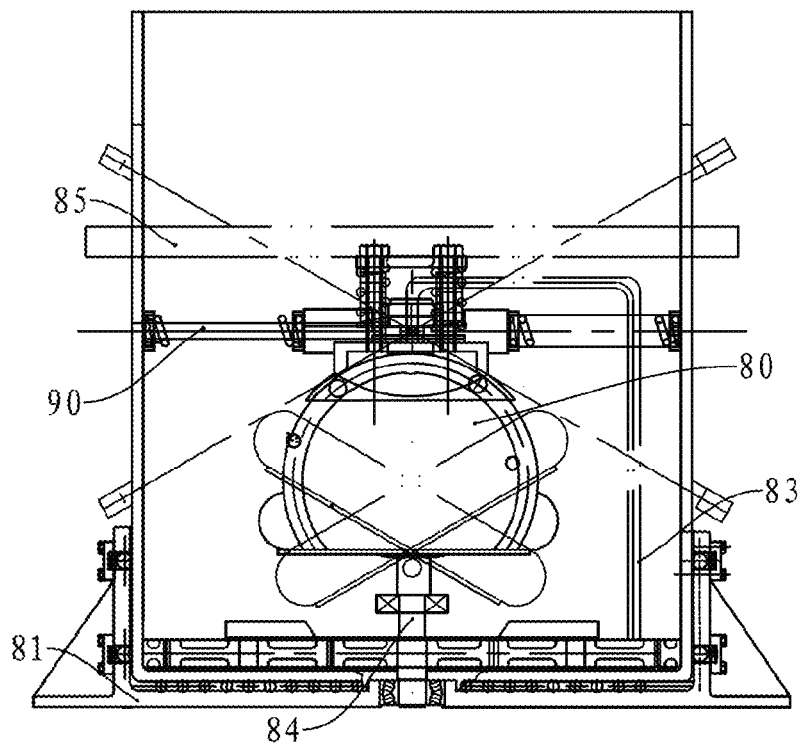
FIG. 23 is a structural view of a balanced rotary body in an application of the second embodiments of the ball joints universal rotary motor without a pump assembly.
Figure 24:
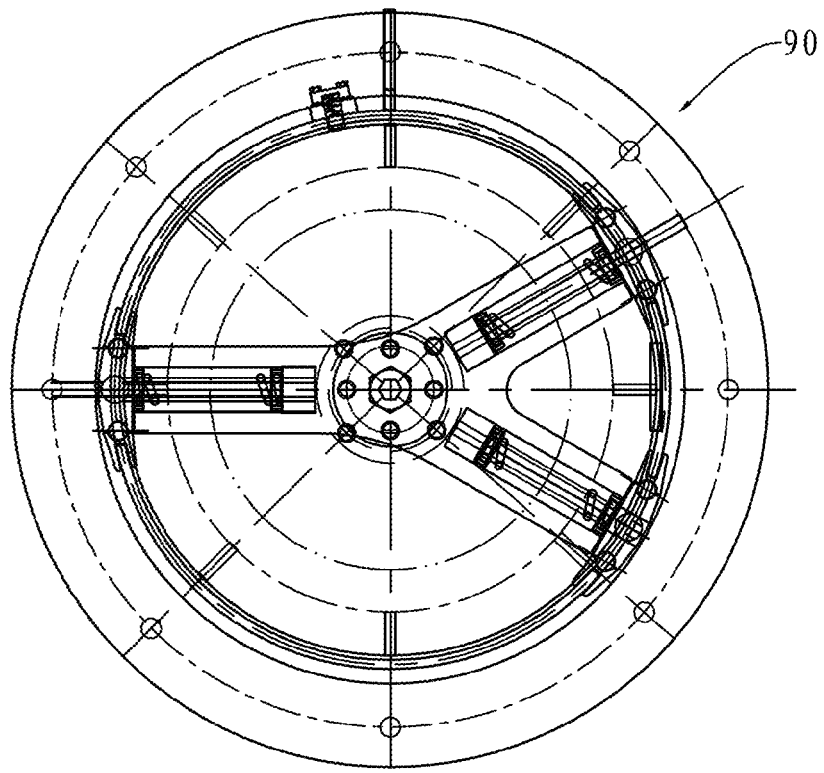
FIG. 24 is a structural view of a Y-shaped base of the balanced rotary body in an application of the second embodiments of the ball joints universal rotary motor without a pump assembly.
Figure 25:
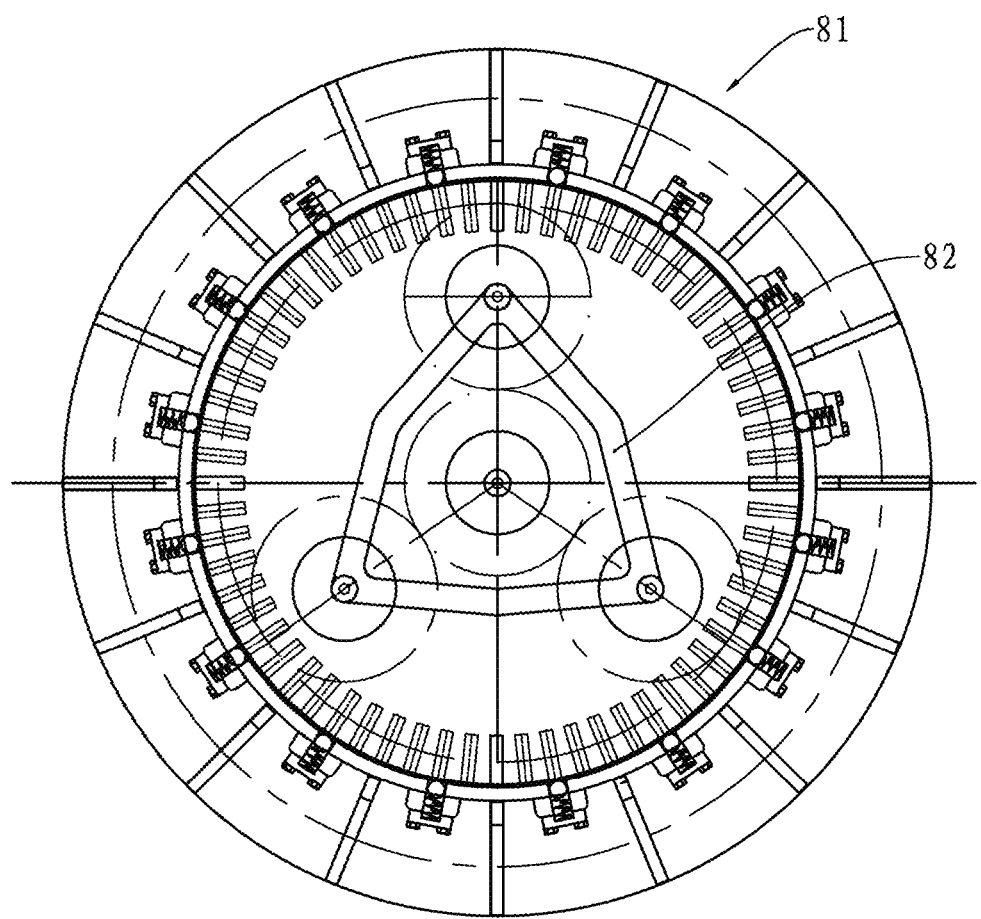
FIG. 25 is a structural view of a base of the balanced rotary body in an application of the second embodiments of the ball joints universal rotary motor without a pump assembly.

As shown in FIGS. 23 to 25, the application of the present disclosure also includes a use of the ball joints universal rotary motor 80 in a balanced rotary body. The balanced rotary body comprises a round base 81. The base 81 is provided with a planetary gear mechanism 82. A support shaft 84 is mounted on the base 81. The support shaft 84 and the rotary shaft 58 of the ball joints universal rotary motor 80 are connected, so that the rotor body 60 does not move with respect to the base 81.

A Y-shaped base 90 is securely connected on a housing 31 of the ball joints universal rotary motor 80. A basal plate 85 is mounted on a top of the Y-shaped base 90. In some applications, a firearm device, such as a machine gun, may be installed on the basal plate 85. In addition, an air pipe 83 is connected with the base 81 at one end, and is connected with an air inlet 51 of a pump assembly 50 of the ball joints universal rotary motor 80 at the other end.

When at work, the rotor body 60 is securely connected on the support shaft 84, and the stator body 30 is configured to drive the housing 31 to rotate relative to the rotor body 60, so that the basal plate 85 rotates and a firearm device installed on the basal plate 85 rotates to realize targeting at multiple angles. An additional application of the ball joints universal rotary motor includes a use in a missile launch device.

The present disclosure provides that the ball joints universal rotary motor may rotate not only along the axis of its bolt, but also along multiple directions. As such, the disclosure provides a three dimensional motor, with wide applications in various areas, such as in military devices and household appliances, to realize the miniaturization of a three-dimensional movement apparatus.

The illustrated embodiments are only some of the preferred embodiments, and there may be variations during their applications. For example, the motor may be manufactured as a three-phase motor or a single phase motor; or the notch does not comprise a projection on a housing of the stator body; or the number of layers of the armature is not eight, but is six or ten etc., or as long as it is an even number above 2, and the multiple layers of the armatures are symmetrically distributed on the axis of the rotor body; all the changes above may realize the goal of the motor in the present disclosure.

Other variations include a change of the number of silicon steel laminations on each layer of armature of the present disclosure.

In relation to the claims, it is intended that when words such as "a," "an," "at least one," or "at least one portion" are used to preface a feature there is no intention to limit the claim to only one such feature unless specifically stated to the contrary in the claim. The descriptions above are intended to be illustrative, not limiting. Thus, it will be apparent to one skilled in the art that modifications may be made without departing from the scope of the claims set out below.

What is claimed is:

1. A rotary motor comprising:
   a stator body,
   a rotor body configured to be rotatorily positioned within the stator body,
   a first set of coils and a second set of coils, both sets wound on the rotor body;
   wherein energizing the first set of coils causes the rotor body to rotate about a first axis relative to the stator body;
   wherein energizing both the first set and the second set of coils causes the rotor body to rotate about a second axis relative to the stator body; and
   wherein the first axis and the second axis are different.

2. The rotary motor of claim 1, wherein the rotor body comprises multiple layers of armatures.

3. The rotary motor of claim 2, wherein two coils of the second set of coils are connected, the two coils respectively wound on two armatures symmetrical with respect to a center of the stator body.

4. The rotary motor of claim 2, wherein the multiple layers of armatures are connected by a bolt.

5. The rotary motor of claim 2, further comprising a spacer layer between every two adjacent layers of armatures.

6. The rotary motor of claim 1, wherein energizing the second set of coils generates a rotating magnetic field around an axis different from the first axis.

* * * * *